(12) United States Patent
Xu et al.

(10) Patent No.: US 10,203,214 B2
(45) Date of Patent: Feb. 12, 2019

(54) METHOD AND APPARATUS FOR FILTERING DEVICE LOCATION POINTS IN A SAMPLED TRAJECTORY WHILE MAINTAINING PATH RECONSTRUCTABILITY

(71) Applicant: HERE Global B.V., Eindhoven (NL)

(72) Inventors: Bo Xu, Lisle, IL (US); Muhammed Mas-Ud Hussain, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 27 days.

(21) Appl. No.: 15/425,531

(22) Filed: Feb. 6, 2017

(65) Prior Publication Data
US 2018/0224293 A1    Aug. 9, 2018

(51) Int. Cl.
*G01C 21/34* (2006.01)
*G06F 17/30* (2006.01)
*G01C 21/30* (2006.01)

(52) U.S. Cl.
CPC ......... *G01C 21/3446* (2013.01); *G01C 21/30* (2013.01); *G06F 17/30241* (2013.01); *G06F 17/30958* (2013.01)

(58) Field of Classification Search
CPC .... G01C 21/26; G01C 21/3446; G01C 21/30; G08G 1/08; G06Q 30/00; G01S 1/00; G06F 17/30958; G06F 17/30241
See application file for complete search history.

(56) References Cited

U.S. PATENT DOCUMENTS 7,269,507 B2    9/2007  Cayford
8,249,807 B1    8/2012  Barbeau et al.
(Continued)

FOREIGN PATENT DOCUMENTS

EP    2568309 A1    3/2013

OTHER PUBLICATIONS

Wu et al., "An All-Time-Domain Moving Object Data Model, Location Updating Strategy, and Position Estimation", International Journal of Distributed Sensor Networks, Feb. 20, 2014, vol. 2015, retrieved on Dec. 21, 2016 from http://journals.sagepub.com/doi/pdf/10.1155/2015/463749, 11 Pages.

*Primary Examiner* — Yonel Beaulieu
*Assistant Examiner* — Martin A Weeks
(74) *Attorney, Agent, or Firm* — Ditthavong & Steiner, P.C.

(57) ABSTRACT

An approach is provided for filtering device location points in a sampled trajectory while maintaining path reconstructability. The approach involves determining a first location point in the sampled trajectory that is an unfiltered location point. The sampled trajectory includes device location points sampled by a device traversing a road network. The approach also involves determining a fastest alternative path from the first location point to a second location point. The approach further involves calculating a sampling time difference between a time at which the first location point was sampled and another time at which the second location point was sampled. The approach further involves designating the second location point as a next unfiltered location point when the sampling time difference is within a threshold value of a free-flow travel time calculated for the fastest alternative path. Otherwise, the second location point is designated as a filtered location point.

21 Claims, 13 Drawing Sheets

(56) References Cited

U.S. PATENT DOCUMENTS

| | | | |
|---|---|---|---|
| 8,560,236 B1 | 10/2013 | Zahir et al. | |
| 8,825,359 B1* | 9/2014 | Wolf | G01C 21/32 |
| | | | 340/907 |
| 9,140,567 B2 | 9/2015 | Fryer et al. | |
| 2003/0060973 A1* | 3/2003 | Mathews | G01C 21/26 |
| | | | 701/410 |
| 2009/0167554 A1 | 7/2009 | Munje et al. | |
| 2009/0174600 A1* | 7/2009 | Mazlum | G01S 19/50 |
| | | | 342/357.58 |
| 2011/0208426 A1* | 8/2011 | Zheng | G01C 21/30 |
| | | | 701/532 |
| 2011/0320120 A1* | 12/2011 | Tielens | G01C 21/26 |
| | | | 701/516 |
| 2012/0010811 A1 | 1/2012 | Hamada | |
| 2016/0086487 A1* | 3/2016 | Abraham | H04W 4/046 |
| | | | 340/905 |

* cited by examiner

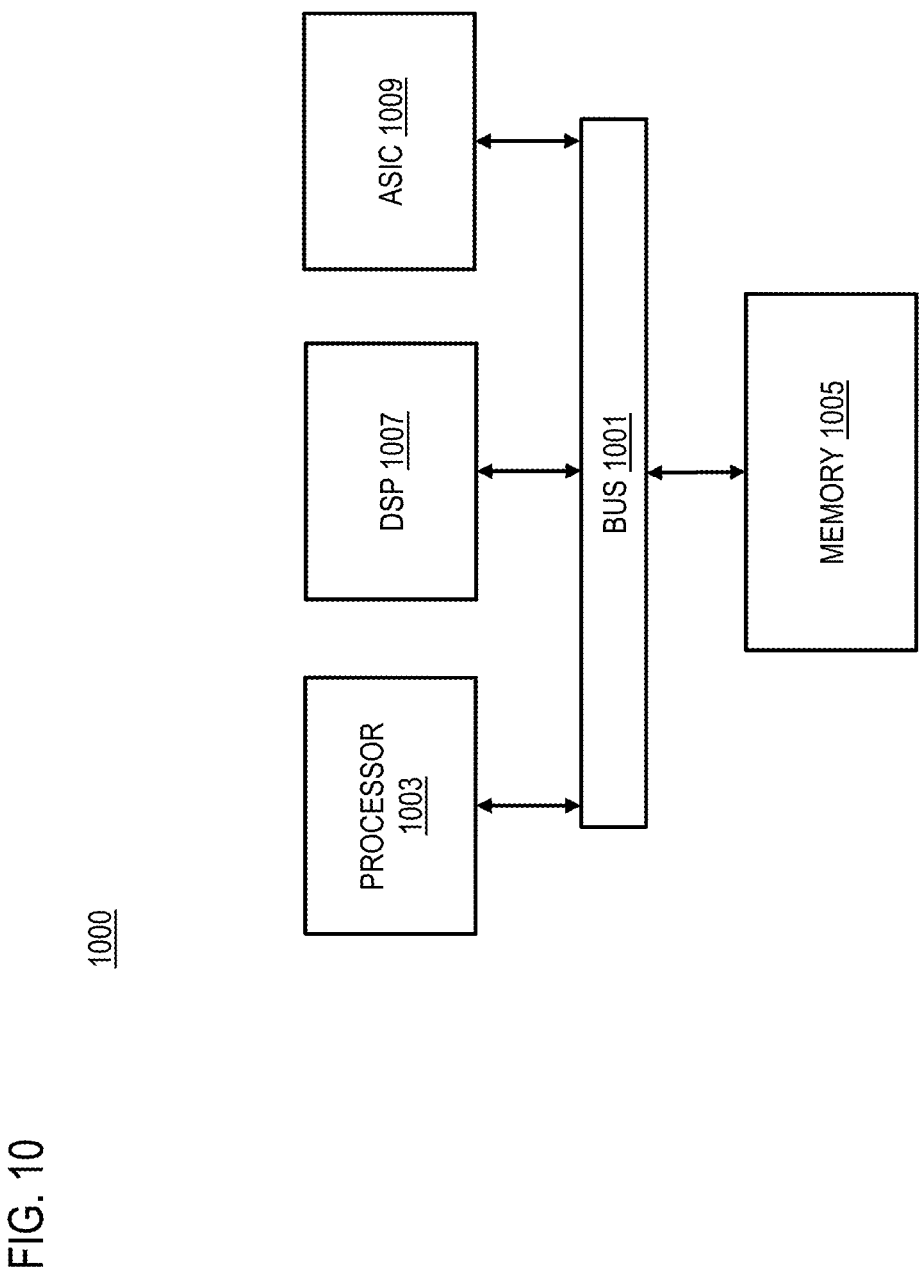

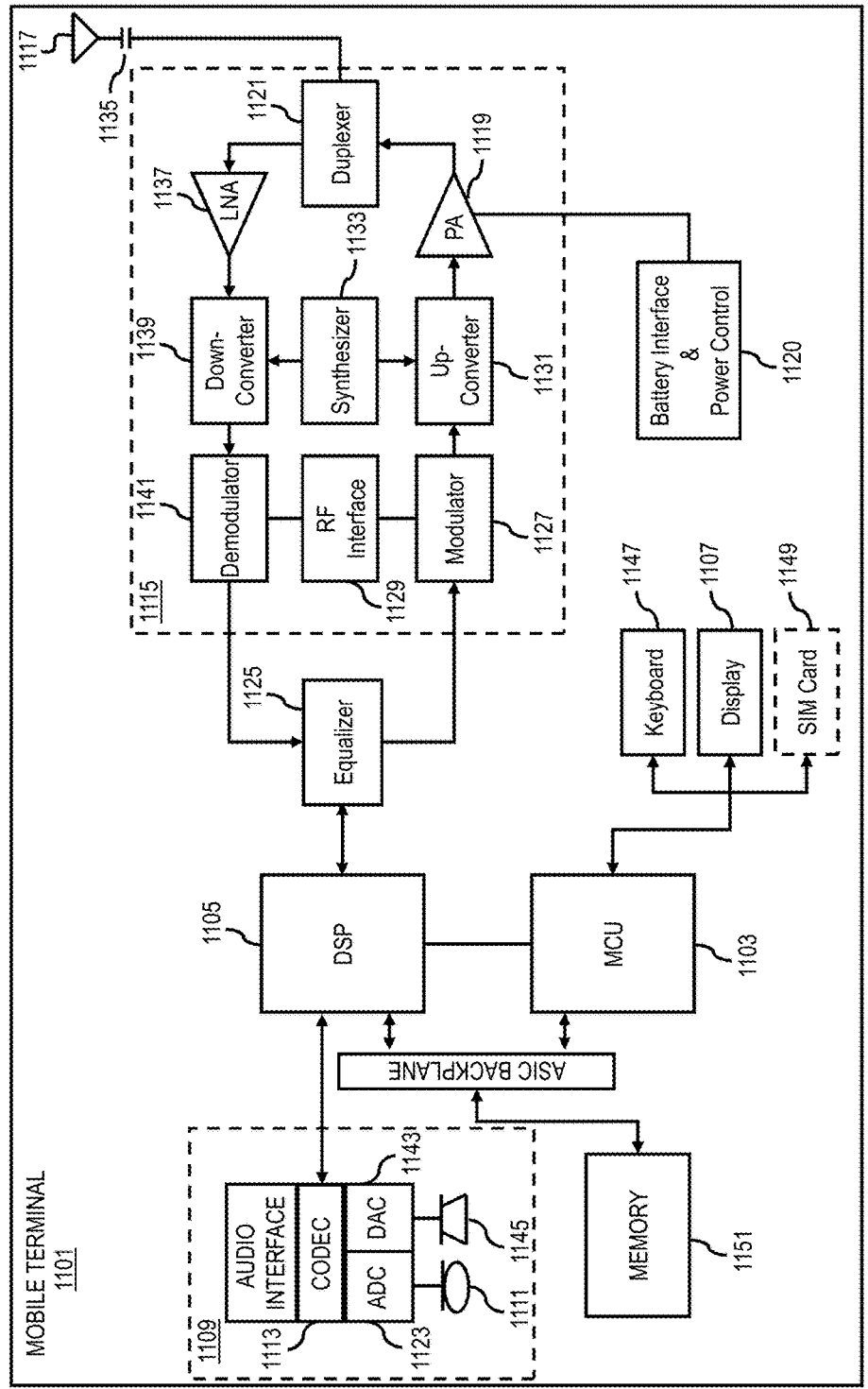

METHOD AND APPARATUS FOR FILTERING DEVICE LOCATION POINTS IN A SAMPLED TRAJECTORY WHILE MAINTAINING PATH RECONSTRUCTABILITY

BACKGROUND

Modern devices (e.g., mobile devices, vehicles, Internet-of-things (IoT) devices, etc.) often closely track their own locations via onboard sensors (e.g., GPS or other location sensors). In many cases, these devices track or sample location points at a much higher rate than needed to reconstruct the travel path taken by the device through a road or other area. However, when used for path reconstruction of a device or probe, the densely sampled trajectories can result in collecting, transmitting, storing, and/or processing large amounts of potentially unnecessary location data. Accordingly, service providers face significant technical challenges to balance the amount of location points of a sampled trajectory that is used for path reconstruction.

SOME EXAMPLE EMBODIMENTS

Therefore, there is a need for an approach for filtering location points in a sampled trajectory while maintaining path reconstructability.

According to one embodiment, a method comprises determining a first location point in a sampled trajectory that is an unfiltered location point. The sampled trajectory includes a plurality of device location points sampled by one or more sensors of a device traversing a road network. The method also comprises determining a fastest alternative path from the first location point to a second location point that follows the first location point in the sampled trajectory. The method further comprises calculating a sampling time difference between a time at which the first location point was sampled and another time at which the second location point was sampled. The method further comprises designating the second location point as a next unfiltered location point when the sampling time difference is within a threshold value of a free-flow travel time calculated for the fastest alternative path. The method further comprises designating the second location point as a filtered location point when the sampling time difference is not within a threshold criterion of the of a free-flow travel time calculated for the fastest alternative path.

According to another embodiment, an apparatus comprises at least one processor, and at least one memory including computer program code for one or more computer programs, the at least one memory and the computer program code configured to, with the at least one processor, cause, at least in part, the apparatus to determine a first location point in the sampled trajectory that is an unfiltered location point. The sampled trajectory includes a plurality of device location points sampled by one or more sensors of a device traversing a road network. The apparatus is also caused to determine a fastest alternative path from the first location point to a second location point that follows the first location point in the sampled trajectory. The apparatus is further caused to calculate a sampling time difference between a time at which the first location point was sampled and another time at which the second location point was sampled. The apparatus is further caused to designate the second location point as a next unfiltered location point when the sampling time difference is within a threshold value of a free-flow travel time calculated for the fastest alternative path. The apparatus is further caused to designate the second location point as a filtered location point when the sampling time difference is not within a threshold criterion of the of a free-flow travel time calculated for the fastest alternative path.

According to another embodiment, a non-transitory computer-readable storage medium for adaptive location sampling in a mobile device, carries one or more sequences of one or more instructions which, when executed by one or more processors, cause, at least in part, an apparatus to determine a first location point in the sampled trajectory that is an unfiltered location point. The sampled trajectory includes a plurality of device location points sampled by one or more sensors of a device traversing a road network. The apparatus is also caused to determine a fastest alternative path from the first location point to a second location point that follows the first location point in the sampled trajectory. The apparatus is further caused to calculate a sampling time difference between a time at which the first location point was sampled and another time at which the second location point was sampled. The apparatus is further caused to designate the second location point as a next unfiltered location point when the sampling time difference is within a threshold value of a free-flow travel time calculated for the fastest alternative path. The apparatus is further caused to designate the second location point as a filtered location point when the sampling time difference is not within a threshold criterion of the of a free-flow travel time calculated for the fastest alternative path.

According to another embodiment, an apparatus comprises means for determining a first location point in the sampled trajectory that is an unfiltered location point, wherein the sampled trajectory includes a plurality of device location points sampled by one or more sensors of a device traversing a road network. The apparatus also comprises means for determining a fastest alternative path from the first location point to a second location point that follows the first location point in the sampled trajectory. The apparatus further comprises means for calculating a sampling time difference between a time at which the first location point was sampled and another time at which the second location point was sampled. The method further comprises means for designating the second location point as a next unfiltered location point when the sampling time difference is within a threshold value of a free-flow travel time calculated for the fastest alternative path. The method further comprises means for designating the second location point as a filtered location point when the sampling time difference is not within a threshold criterion of the of a free-flow travel time calculated for the fastest alternative path.

According to one embodiment, a method comprises determining a first location point in the sampled trajectory that is an unfiltered location point. The sampled trajectory includes a plurality of device location points sampled by one or more sensors of a device traversing a road network. The method also comprises calculating a sampling time difference between a time at which the first location point was sampled and another time at which a second location point was sampled. The second location point follows the first location point in the sample trajectory. When the second location point is not within a threshold distance of an intersection point of the road network, the method further comprises designating the second location point as a next unfiltered location point when the sampling time difference is within a threshold value of a free-flow travel time calculated for a fastest alternative path between the first location point and the second location point. When the second location point is within a threshold distance of the intersection point, the method further comprises designating the second location point as the next unfiltered location point when the sampling time difference and another free-flow travel time calculated for another fastest alternative path between the first location point and the intersection point differ by less than a calculated time for the device to traverse the threshold distance to the intersection point.

According to another embodiment, an apparatus comprises at least one processor, and at least one memory including computer program code for one or more computer programs, the at least one memory and the computer program code configured to, with the at least one processor, cause, at least in part, the apparatus to determine a first location point in the sampled trajectory that is an unfiltered location point. The sampled trajectory includes a plurality of device location points sampled by one or more sensors of a device traversing a road network. When the second location point is not within a threshold distance of an intersection point of the road network, the apparatus is further caused to designate the second location point as a next unfiltered location point when the sampling time difference is within a threshold value of a free-flow travel time calculated for a fastest alternative path between the first location point and the second location point. When the second location point is within a threshold distance of the intersection point, the apparatus is further caused to designate the second location point as the next unfiltered location point when the sampling time difference and another free-flow travel time calculated for another fastest alternative path between the first location point and the intersection point differ by less than a calculated time for the device to traverse the threshold distance to the intersection point.

According to another embodiment, a non-transitory computer-readable storage medium carries one or more sequences of one or more instructions which, when executed by one or more processors, cause, at least in part, an apparatus to determine a first location point in the sampled trajectory that is an unfiltered location point. The sampled trajectory includes a plurality of device location points sampled by one or more sensors of a device traversing a road network. When the second location point is not within a threshold distance of an intersection point of the road network, the apparatus is further caused to designate the second location point as a next unfiltered location point when the sampling time difference is within a threshold value of a free-flow travel time calculated for a fastest alternative path between the first location point and the second location point. When the second location point is within a threshold distance of the intersection point, the apparatus is further caused to designate the second location point as the next unfiltered location point when the sampling time difference and another free-flow travel time calculated for another fastest alternative path between the first location point and the intersection point differ by less than a calculated time for the device to traverse the threshold distance to the intersection point.

According to another embodiment, an apparatus comprises means for determining an ordered pair of nodes within a graph representing a localized area of a transportation network. The apparatus also comprises means for determining a first location point in the sampled trajectory that is an unfiltered location point. The sampled trajectory includes a plurality of device location points sampled by one or more sensors of a device traversing a road network. The apparatus further comprise means for calculating a sampling time difference between a time at which the first location point was sampled and another time at which a second location point was sampled, wherein the second location point follows the first location point in the sample trajectory. When the second location point is not within a threshold distance of an intersection point of the road network, the apparatus further comprises means for designating the second location point as a next unfiltered location point when the sampling time difference is within a threshold value of a free-flow travel time calculated for a fastest alternative path between the first location point and the second location point. When the second location point is within a threshold distance of the intersection point, the apparatus further comprises means for designating the second location point as the next unfiltered location point when the sampling time difference and another free-flow travel time calculated for another fastest alternative path between the first location point and the intersection point differ by less than a calculated time for the device to traverse the threshold distance to the intersection point According to another embodiment, a method comprises mapping a fastest alternative route from a first location point in the sampled trajectory to a second location point in the sampled trajectory to one or more links of a geographic database representing a road network. The sampled trajectory includes a plurality of device location points sampled by one or more sensors of a device traversing the road network, and the first location point is an unfiltered location point. The method also comprises designating one or more complete links among the one or more links as a trunk portion. Each of the one or more complete links include a respective tail node and a head node that lies within the fastest alternative route. The method further comprises calculating a sampling time difference between a time at which the first location point was sampled and another time at which the second location point was sampled. The method further comprises designating the second location point as a next unfiltered location point when the sampling time difference is within a threshold value of a free-flow travel time calculated for traversing the one or more links. The method further comprises initiating a re-determination the trunk portion when the second location point is designated as the next unfiltered location point.

According to another embodiment, an apparatus comprises at least one processor, and at least one memory including computer program code for one or more computer programs, the at least one memory and the computer program code configured to, with the at least one processor, cause, at least in part, the apparatus to map a fastest alternative route from a first location point in the sampled trajectory to a second location point in the sampled trajectory to one or more links of a geographic database representing a road network. The sampled trajectory includes a plurality of device location points sampled by one or more sensors of a device traversing the road network, and the first location point is an unfiltered location point. The apparatus is also caused to designate one or more complete links among the one or more links as a trunk portion. Each of the one or more complete links include a respective tail node and a head node that lies within the fastest alternative route. The apparatus is further caused to calculate a sampling time difference between a time at which the first location point was sampled and another time at which the second location point was sampled. The apparatus is further caused to designate the second location point as a next unfiltered location point when the sampling time difference is within a threshold value of a free-flow travel time calculated for traversing the one or more links. The apparatus is further caused to initiate a re-determination the trunk portion when the second location point is designated as the next unfiltered location point.

According to another embodiment, a non-transitory computer-readable storage medium for adaptive location sampling in a mobile device, carries one or more sequences of one or more instructions which, when executed by one or more processors, cause, at least in part, an apparatus to map a fastest alternative route from a first location point in the sampled trajectory to a second location point in the sampled trajectory to one or more links of a geographic database representing a road network. The sampled trajectory includes a plurality of device location points sampled by one or more sensors of a device traversing the road network, and the first location point is an unfiltered location point. The apparatus is also caused to designate one or more complete links among the one or more links as a trunk portion. Each of the one or more complete links include a respective tail node and a head node that lies within the fastest alternative route. The apparatus is further caused to calculate a sampling time difference between a time at which the first location point was sampled and another time at which the second location point was sampled. The apparatus is further caused to designate the second location point as a next unfiltered location point when the sampling time difference is within a threshold value of a free-flow travel time calculated for traversing the one or more links. The apparatus is further caused to initiate a re-determination the trunk portion when the second location point is designated as the next unfiltered location point.

According to another embodiment, an apparatus comprises means for mapping a fastest alternative route from a first location point in the sampled trajectory to a second location point in the sampled trajectory to one or more links of a geographic database representing a road network. The sampled trajectory includes a plurality of device location points sampled by one or more sensors of a device traversing the road network, and wherein the first location point is an unfiltered location point. The apparatus also comprises means for designating one or more complete links among the one or more links as a trunk portion. Each of the one or more complete links include a respective tail node and a head node that lies within the fastest alternative route. The apparatus further comprises means for calculating a sampling time difference between a time at which the first location point was sampled and another time at which the second location point was sampled. The apparatus further comprises means for designating the second location point as a next unfiltered location point when the sampling time difference is within a threshold value of a free-flow travel time calculated for traversing the one or more links. The apparatus further comprises means for initiating a re-determination the trunk portion when the second location point is designated as the next unfiltered location point.

According to another embodiment, a method comprises determining a sampled location point indicating a location of a device within a road network. The method also comprises determining road information based one or more intersection points proximate to the location of the device. The method further comprises determining whether to transmit the sampled location point as a location update based on the road information.

According to another embodiment, an apparatus comprises at least one processor, and at least one memory including computer program code for one or more computer programs, the at least one memory and the computer program code configured to, with the at least one processor, cause, at least in part, the apparatus to determine a sampled location point indicating a location of a device within a road network. The apparatus is also caused to determine road information based one or more intersection points proximate to the location of the device. The apparatus is further caused to determine whether to transmit the sampled location point as a location update based on the road information.

According to another embodiment, an apparatus comprises means for determining a sampled location point indicating a location of a device within a road network. The apparatus also comprises means for determining road information based one or more intersection points proximate to the location of the device. The apparatus further comprises means for determining whether to transmit the sampled location point as a location update based on the road information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 10 is a diagram of a chip set that can be used to implement an embodiment of the invention; and FIG. 11 is a diagram of a mobile terminal (e.g., mobile computer) that can be used to implement an embodiment of the invention.

DESCRIPTION OF SOME EMBODIMENTS

Figure 1:
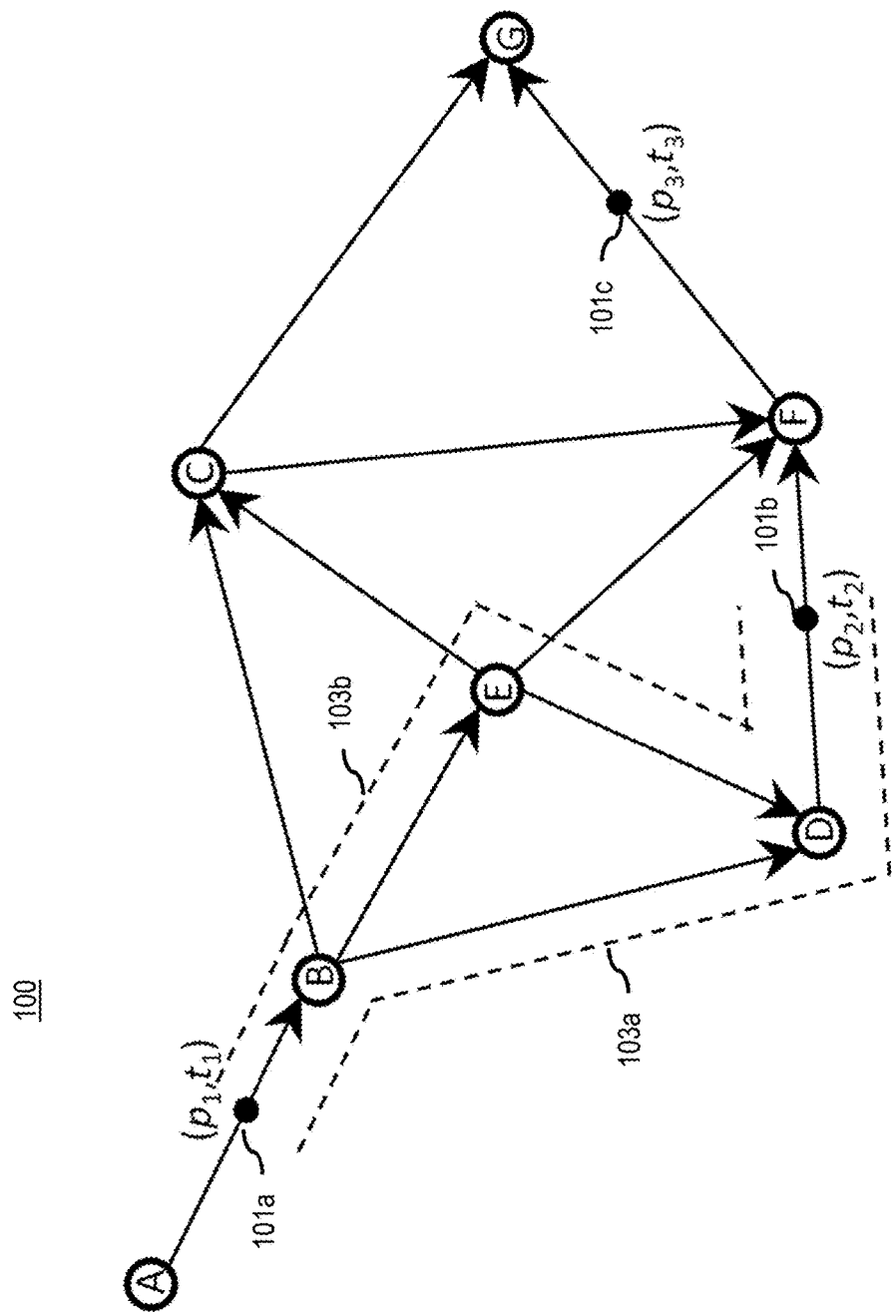
FIG. 1 is a diagram illustrating path reconstructability problems within a graph representing a transportation network, according to one embodiment.

Examples of a method, apparatus, and computer program for filtering location points in a sampled trajectory while maintaining path reconstructability are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As discussed above, devices (e.g., mobile devices, vehicles, Internet-of-thing (IoT) devices, etc.) may closely track their own locations via onboard sensors (e.g., GPS receivers). In one embodiment, for instance, when acting as probes, the devices can periodically update their locations (e.g., as location trajectory data comprising a sequence a location points sampled over time) to a remote server system via wireless or other communication means. Due to bandwidth constraints and/or cost of communication, it is desirable that the frequency of location updates and/or the sizes of the reported location trajectories be minimized. On the other hand, it is also desirable that the server is able to unambiguously infer or reconstruct the traveled path of the probes from their location updates; this may not be possible if the location update frequency is too low. For example, one example approach to inferring or reconstructing a traveled path is by taking the shortest path between consecutive probe or location points.

However, this is not always reliable because the probe may well have taken other paths depending on the update frequency (e.g., when multiple paths exist between the consecutive probe points). This problem is illustrated with respect to FIG. 1, which is a diagram of a graph 100 representing a localized area of a transportation network, according to one embodiment. The graph 100 illustrates the effect of data sparseness on whether a path of a device can be accurately map matched or determined from reported location trace data. As shown, the graph 100 represents a localized area of a transportation network (e.g., a road network) in terms of nodes and links. By way of example, each node within the graph represents a location point (e.g., latitude and longitude coordinates), and each link represents a road or travel segment between the nodes. The nodes and links are defined according to the geospatial arrangement of the transportation or road network that they represent. In one embodiment, the graph 100 is a simple directed graph $G=(V, L)$, where V is a set of all nodes in the localized area (e.g., nodes A through G as shown in the graph 100), and L is a set of all links between the nodes of the localized area. As shown, the links are directional according to the depicted direction of arrow of each link representation. In one embodiment, a link (u,v) is considered to be directed from u to v; where u is the tail of the link and v is head of the link.

A location trace of a mobile device (e.g., a probe) traveling the transportation network of the graph 100 is expressed as a sequence of location points 101a-101c (also collectively referred to as location points 101). Each location point 101a-101c is respectively represented by $(p_1, t_1)$, $(p_2, t_2), \ldots, (p_n, t_n)$ where $p_1$-$p_n$ indicate locations of the device at each time $t_1$-$t_n$, and where $t_1 < t_2 < \ldots < t_n$. In one embodiment, the time difference between two consecutive locations points 101 is referred to as a sampling interval.

Now consider the problem of reconstructing the traveled path from the location trace comprising location points 101a-101c. For the time period from $t_2$ to $t_3$, it is clear that the device or probe must have traveled along the path $p_2 \rightarrow F \rightarrow p_3$ because this is the only path from $p_2$ to $p_3$. For the time period from $t_1$ to $t_2$, on the other hand, it is not clear which path the probe has traveled because there is no sampled location point in the location trace that can disambiguate the path taken by the probe. Based on the location trace, the probe could have traveled along the path 103a represented by $p_1 \rightarrow B \rightarrow D \rightarrow p_2$ or the path 103b represented by $p_1 \rightarrow B \rightarrow E \rightarrow D \rightarrow p_2$.

A potential solution to the problem is to increase the frequency of location updates from the reporting device or probe to effectively reducing the sampling interval between location points. In one embodiment, the sampling interval is a period time (e.g., expressed in a time unit such as a second, minute, etc.) between one reported location point and a subsequently reported location point. In one embodiment, the probe or device is configured to sample its location at a higher frequency than what is reported by the probe or device. For example, while a device may sample or track its location every second (e.g., 1 Hz), the device only reports a location update to, e.g., a location server, mapping platform, application, etc., once every minute. The reported location point refers to the location point of the sample trajectory that is reported as a location update. However, globally increasing the reporting frequency can result in creating potentially unnecessary location points that would impose an unnecessary resource burden to collect, transmit, store, and/or process. For example, while globally increasing the location update frequency can potentially add extra location points between location point 101a and 101b to disambiguate the path to allow unambiguous path reconstruction, it would also add extra location points between location points 101b and 101c. Any extra location point(s) between location points 101b and 101c would be unnecessary for path reconstruction because the path between those points was not ambiguous. Accordingly, the extra location points would result in unnecessarily increasing battery consumption and resource usage (e.g., memory, bandwidth, and/or processing resources) needed to collect, transmit, store, and/or process the additional points. This problem can be greatly exacerbated when thousands or millions of probes or devices are simultaneously reporting their location points. Accordingly, service provides face significant technical challenges to providing a location update policy to probe data providers so that communication and resource costs are minimized while providing good quality probe data in the sense that there is no ambiguity when reconstructing a traveled path. In one embodiment, the location update or filtering policy describes the rules and/or processes for determining whether an individual location point in a sample trajectory should be kept (e.g., be unfiltered) or discarded (e.g., filter) with respect to an application or use of the policy (e.g., location point update, trajectory compression, etc.).

In addition to location updates, consider another application scenario. Suppose that are a lot of densely sampled trajectories (e.g., GPS data sampled at 1 HZ) stored in database. Because of the high density of the location points in the sample trajectories, storage sizes of each sample trajectory also can be high. The problem of creating a concise representation (or compression) of these trajectories such that the traveled path can be uniquely and reliably reconstructed when needed also encounters the same problem of data sparseness versus path reconstructability as describe with respect to location updates above. Such a concise representation may be advantageously used, for example, for reduced storage requirement or reduced transmission size in the case that the trajectories are transmitted from one place to another. Accordingly, service providers also face the significant technical challenges in determining how to filter the trajectory points so that as few as possible of the location points are kept but still ensuring that the traveled path can be reconstructed with no ambiguity.

Figure 2:
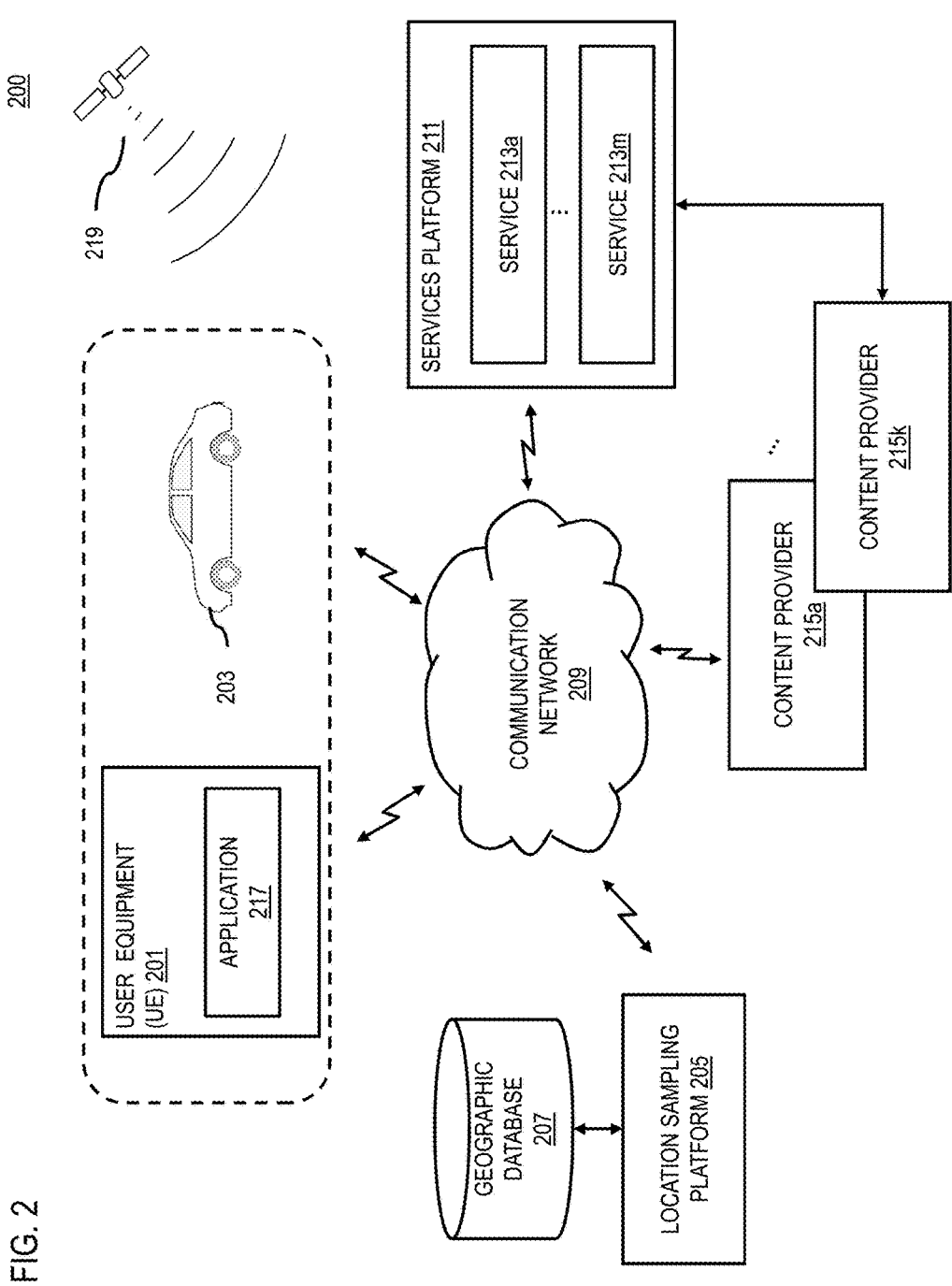
FIG. 2 is a diagram of a system for filtering location points in sampled trajectory while maintaining path reconstructability, according to one embodiment.

To address this problem, a system 200 as shown in FIG. 2 introduces a capability to filter location points in a sampled trajectory of a device or probe by checking the sampling time difference or interval between locations points that are to be kept (e.g., unfiltered location points) against the calculated travel time to traverse a fastest alternative route between the location points. By way of example, the fastest alternative route is route with the fastest calculated travel time other than the actual route of the probe between the location points. If the sampling time difference is less than the calculated travel time of the fastest alternative route by more than a threshold value then the location point is not kept (e.g., the location point is filtered). However, if the sampling time difference is within this threshold value of the calculated travel time, then the location point is kept. In one embodiment, the threshold value is based on the sampling frequency used by the device, and is determined so that the sampling time difference for the next expected location sampling point does not exceed the calculated travel time for the fastest alternative route.

For example, $(x0,y0,t0)$ be the last trajectory point that the system 200 choose to keep (e.g., for the location update application, this means the last location update point; and for the trajectory compression algorithm, this means the last location point added to a compressed version of the sampled trajectory). The system 200 then checks the following trajectory points one by one to determine which is the next trajectory point to keep or to designate as unfiltered (e.g., this means the next location update point, next location point to be added to the compressed trajectory, or next unfiltered location point). In this example, let $(x,y,t)$ be a following trajectory point to be checked. Since the trajectory is densely sampled, the system 200 knows the actual traveled path from $(x0,y0,t0)$ to $(x,y,t)$. The system 200 then computes the fastest alternative path from location $(x0,y0)$ to location $(x,y)$, i.e., the path with shortest free-flow travel time among all the alternative paths from $(x0,y0)$ to $(x,y)$. If the difference between t and t0 is about to reach but still smaller than the free-flow travel time of the fastest alternative path, then $(x,y,t)$ is kept as an unfiltered location point; otherwise the system 200 discards it.

As described above, in one embodiment, the system 200 can provide for path reconstructability by ensuring that a location update occurs before the sampling time difference (e.g., between the last update and next expected location point) exceeds the free-flow travel time. In other words, the system 200 determines when the time difference is about to reach but is still smaller than the free-flow travel time of the fastest alternative route. For example, in one embodiment, the system 200 determines or anticipates the next location point based on the sampling interval used by the device or probe. Under this policy, if $(x,y,t)$ is kept, then the path from $(x0,y0,t0)$ to $(x,y,t)$ must be the shortest path from $(x0,y0,t0)$ to $(x,y,t)$, and therefore can be exactly re-constructed.

In one embodiment, the system 200 uses road segment or link length information and corresponding speed attributes for road segments within an area near a sampled trajectory to determine an optimal location filtering policy. The optimal filtering policy (e.g., depending on the application, the filtering policy can be a location update or trajectory compression policy), for instance, is the minimum number of unfiltered location points in a sampled trajectory at which the path of the device collecting the location trace data remains unambiguously reconstructable to guarantee path reconstruction. In other words, the system 200 uses the knowledge of the map and the speed attribute for the road links to define an optimal location point filtering policy.

By using the filtering policy as determined according to the various embodiments described herein, a device can report location points using a minimum amount of resources for transmitting a filtered sampled location trajectory that still guarantees path reconstructability. On the receiving end of the filtered trajectories, receiving servers or applications also benefit by having to store and process fewer location points. For example, big data analytics (e.g., involving large data sets) is becoming a concern for many organizations collecting device data (e.g., IoT data, probe data, mobile device data, etc.). For example, as previously noted, big data incurs significant costs and impose significant resource burdens to store and analyze, and is often significantly over sampled (e.g., have higher data densities needed for a given application). In one embodiment, if path reconstruction is the main purpose of an application (e.g., when mobility data is the focus of the analytics), the system 200 can generate filtering policies (e.g., location update and/or trajectory compression policies) that will advantageously provide the least amount of data necessary, thereby reducing the amount and cost of storage, bandwidth, computing resources, etc. needed to process the data.

In one embodiment, the system 200 determines whether to keep or filter a location point in a sampled trajectory based on a travel time computed for a fastest alternative route between the previously kept or unfiltered location point and the current location point of interest. By way of example, the travel time is calculated from the length of the fastest alternative route and a speed attribute (e.g., free-flow speed, speed limit, etc.) for traversing the fastest alternative route. In one embodiment, the road length (e.g., a link length), speed attribute, and the associated links and nodes can be determined from a geographic database 207. The road length, for instance, represents a physical length of each road link comprising the fastest alternative route. The speed attribute indicates an expected travel speed of devices traveling a particular link in the route. For example, the speed attribute can be a speed limit specified for each road link. In another example, the speed attribute can be based on historical speed data (e.g., an observed free-flow speed, an average speed, a speed observed at a particular percentile, etc.).

More specifically, in one embodiment, for each link (u,v) or partial link in the fastest alternative route, where u is a starting node and v is the ending node of the link, the system 200 determines a link length density and a speed attribute to compute a travel time (e.g., travel time=road density/speed attribute) for traversing the link. When the speed attribute is a speed limit or other expected maximum speed of a device, the travel time is defined, for instance, as a minimum travel time (MTT) for the link, which can be denoted as MTT(u,v). It is noted that MTT is a combination of road density (e.g., link length) and speed attribute, and not density and speed attribute individually. It is noted that the travel time and MTT are used interchangeably in the embodiments described herein. The MTT for the fastest alternative route is the sum of the MTT's for all links and partial links in the route. It is noted that although the various embodiments are described with respect to a geographic database 207 that employs a link and node-based representation of a transportation network, it is contemplated that the embodiments described are applicable to any type of road network representation for which a fastest alternative route and its travel time can be determined between two locations in the transportation network.

Figure 3A:
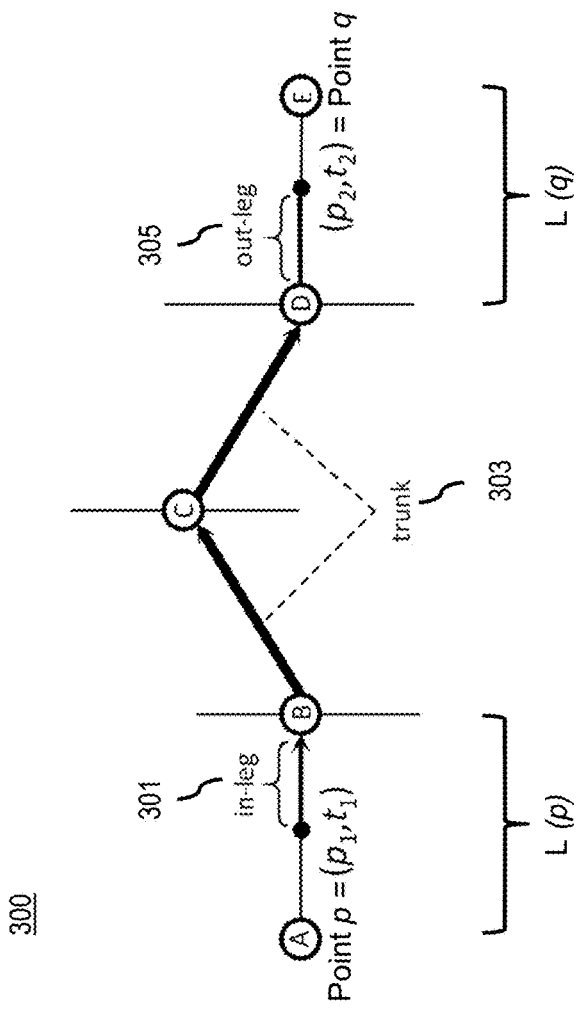
FIG. 3A is a diagram illustrating a structure of a fastest alternative path that has been mapped to links of a geographic database, according to one embodiment.

FIG. 3A is a diagram illustrating a structure of an example fastest alternative path that has been mapped to links of a geographic database, according to one embodiment. As shown in the graph 300 of FIG. 3A, given two points p and q on two links L(p) and L(q) respectively, a route from p to q is a concatenation of three parts: (i) the portion of L(p) starting from p until the head of L(p) (e.g., indicated by node B); (ii) a path from the head of L(p) to the tail of L(q) (e.g., from node B to node D); and (iii) the portion of L(q) starting from the tail of L(q) (e.g., from node B) until q. The portion of L(p) starting from p until the head of L(p) is called the in-leg portion 301, the path from the head of L(p) to the tail of L(q) is called the trunk portion 303, and the portion of L(q) starting from the tail of L(q) until q is called the out-leg portion 305.

In this example, given a route R from p to q, an alternative route of R is a route from p to q that is different than R. The fastest alternative route of R, denoted FAR(R), is the alternative route of R with the smallest MTT. The trunk 303 of FAR(R) is called the fastest alternative trunk (FAT) of R.

By way of example, let $\overline{R}$ be the route that has been traveled since the last location update. Under one embodiment of the approach described herein, a location update is sent when and only when the travel time since the last location update is about to exceed the MTT of the fastest alternative route of $\overline{R}$ (e.g., by determining if the route from the last location update to next sampled location point after the current location point under evaluation would exceed the MTT). This is because once this MTT is exceeded, the server receiving the location update will not be able to determine whether the probe has traveled $\overline{R}$ or its fastest alternative route. Thus, in one embodiment, the system 200 uses a location update or filtering policy that keeps comparing the travel time since the last location update against the MTT of FAR($\overline{R}$) and sends an update when the former is about to exceed the latter.

In one embodiment, the system 200 takes advantage of the link and node-based representation of the transportation to advantageously increase efficiency by reducing computation demands associated with tracking FAR($\overline{R}$) and its MTT as a probe moves along the route. Firstly, observe that while the probe moves along a link, the trunk 303 and therefore the FAT remains unchanged until the probe reaches the link's head. Thus before the link's head is reached, the in-leg 301 and trunk 303 of the FAR($\overline{R}$) remain unchanged and the MTT of FAR($\overline{R}$) increases linearly in the length of the out-leg 305. Secondly, when the probe reaches the link's head, the trunk 303 changes and the FAT may also change. This is because the trunk 303 encompasses those links that are wholly included in the current path from point p to q. As a result, when point q reaches the head of L(q) (e.g., node E), L(q) would also become part of the trunk 303, and the out-leg 305 would move to the subsequent link after L(q). At this moment, there may be a jump (toward a lower value) of the MTT of FAR($\overline{R}$), e.g., because of possible new shorter routes terminating at head of L(q) (e.g., node E) if the head of L(q) is an intersection node (e.g., where other links join).

In one embodiment, based on the above observations and to advantageously reduce computation resources, the filtering policy of the system 200 only computes the FAT at two occurrences: (i) initializing the FAT when a location update is sent; and (ii) updating the FAT when the probe reaches a node. Furthermore, in one embodiment, the system 200 distinguish between two types of check in terms of where it occurs at a link. These two types of checks are an on-link check as shown in FIG. 3B, and an on-node check as shown in FIG. 3C.

Figure 3B:
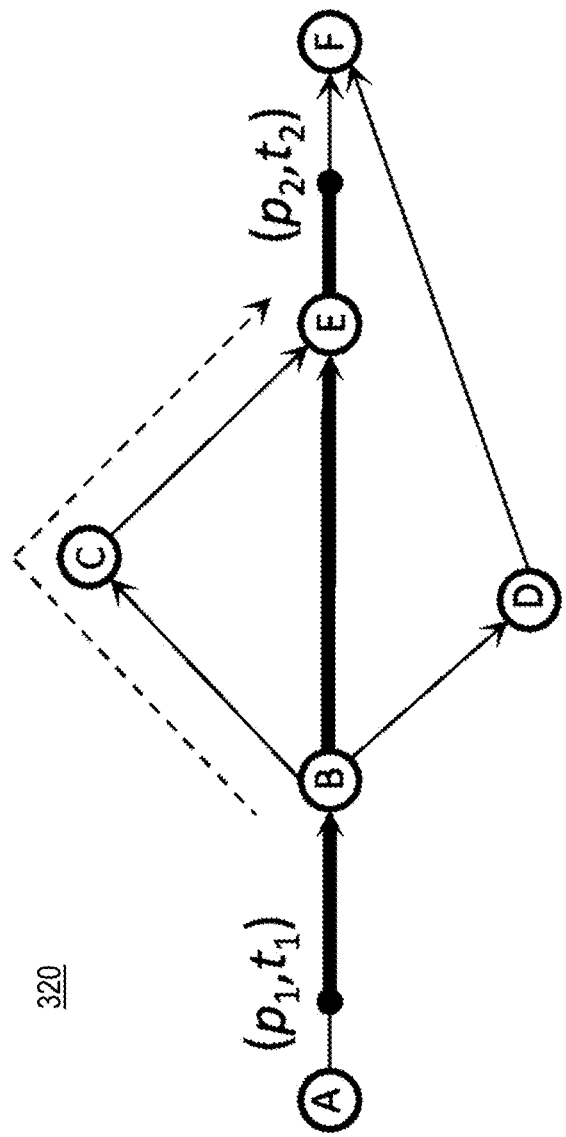
FIG. 3B is a diagram illustrating an example approach to filtering location points in a sampled trajectory while maintaining path reconstructability, according to one embodiment.

As shown in the graph 320 of FIG. 3B, in one embodiment, the on-link check is constantly performed as long as a probe is not about to reach the head of the link that the probe is currently traveling on. In this case, the policy compares the actual travel time with the MTT of the fastest alternative route with trunk ending at the tail of the current link. In the graph 320, the probe is currently at point $p_2$ on the link(E,F). Point $p_2$ is located in the middle of the link(E,F) and is not about to reach the head of the link(E,F) at node F because the system 200 determines or anticipates that there is another location point in the sampled trajectory that occurs or is to occur before reach node F. In this example, the last location update occurs at location $p_1$. The trunk of the actual route traveled by the probe is B→E. The fastest alternative trunk is B→C→E. Accordingly, the on-link check compares the time difference $(t_2-t_1)$ to the travel time of the on-link fastest alternative route (e.g., $MTT(p_1, B,C,E,p_2)$).

Figure 3C:
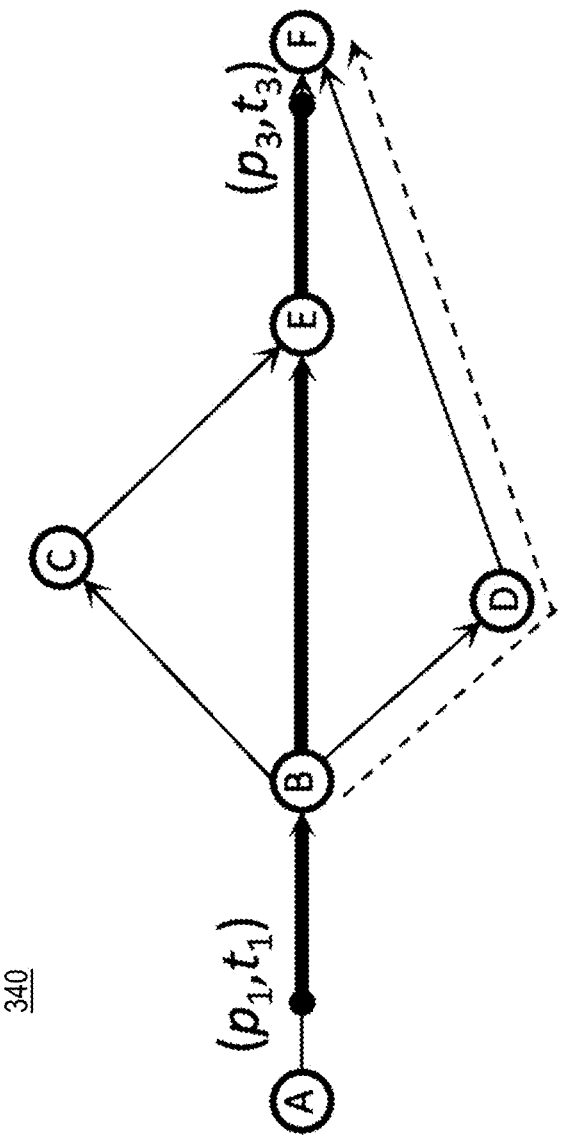
FIG. 3C is a diagram illustrating another example approach to approach to filtering location points in a sampled trajectory while maintaining path reconstructability, according to one embodiment.

As shown in the graph 340 of FIG. 3C, the on-node check occurs when a probe is about to reach the head of the current link. In this case, the policy compares the actual travel time with the MTT of the fastest alternative route with trunk ending at the head of the current link. As previously discussed, this is because there is a possibility that the head of the current link is an intersection point for other links that can possibly provide an even faster alternative route than the previously determined before reaching the node. The graph 340 shows an on-node check occurring at location $p_3$. In this example, the location $p_3$ is very near head of the link(E,F) (e.g., node F). The system 200 determines that location $p_3$ is the last location point that is sampled or expected to be sampled before the probe reaches node F. Therefore, the system 200 performs an on-node check. Based on this on-node check, the trunk of the actual path traveled is still B→E, but the fastest alternative trunk is now B→D→F. Accordingly, the on-node check compares the time difference $(t_3-t_1)$ to the travel time of the on-node fastest alternative route (e.g., $MTT(p_1,B,D,F,p_2)$)

Returning to FIG. 2, the system 200 comprises a location sampling platform 205 with connectivity to the geographic database 207 over a communication network 209. In one embodiment, the location sampling platform 205 performs the processes for filtering location points in sampled trajectories provided by devices of the system 200 (e.g., UE 201 and/or vehicle 203). In this example, the UE 201 and/or vehicles 203 act as probes traveling over a road network represented in the geographic database 207 as nodes and links. Although the vehicle 203 is depicted as an automobile, it is contemplated that the vehicle 203 can be any type of transportation vehicle manned or unmanned (e.g., planes, aerial drone vehicles, motor cycles, boats, bicycles, etc.), and the UE 201 can be a mobile or embedded associated with any of the types of vehicles or a person or thing traveling through the transportation network of the geographic database 207. In one embodiment, the UE 201 and/or vehicle 203 are assigned unique probe identifiers (probe IDs) for use in reporting or transmitting collected probe or location trace data to the location sampling platform 205 and/or other components of the system 200. In one embodiment, the UE 201 and/or vehicle 203 are part of a probe-based system for collecting probe data for monitoring traffic conditions in a transportation network. In other embodiments, the UE 201 and/or vehicle 203 are end user devices that are clients or consumers of navigation and/or mapping related services.

In one embodiment, the UE 201 and/or vehicle 203 are configured to report probe data as probe points or location points according to the filtering policy (e.g., location update policy or compression policy) generated according to the various embodiments described herein. By way of example, probe or location points are individual data records that record location and/or telemetry data collected at a point in time. In one embodiment, a probe point can include attributes such as a location (e.g., provided a geospatial coordinates such as latitude and longitude), a heading, a speed, a time, or a combination thereof of each of the plurality of devices. This list of attributes is provided by way of illustration and not limitation. It is contemplated that any combination of these attributes or other attributes may be recorded as a probe point. In one embodiment, the UE 201 and/or vehicle 203 may include sensors for reporting measurements and/or reporting attributes associated with the device's locations and/or trajectories. The attributes can also be any attribute normally collected by an on-board diagnostic (OBD) system of the vehicle, and available through an interface to the OBD system (e.g., OBD II interface or other similar interface). For example, these attributes can include activation of backup sensors, steering angle, activation of brakes, etc. In one embodiment, the UE 201 and/or vehicle 203 may be configured with one or more sensors for collecting the probe or location trace data sampling rates more dense that reported or used for path reconstruction. The UE 201 and/or vehicle 203 can then provide location updates according to the filtering or location update policies generated according to the various embodiments described herein. By way of example, the sensors may include location sensors (e.g., GPS), accelerometers, compass sensors, gyroscopes, altimeters, etc.

In one embodiment, the sensors of the UE 201 and/or the vehicle 203 are operated in a continuous sampling mode at a predetermined sampling frequency. The UE 201 and/or vehicle 203 can then initiate a location update or other sensor measurement as indicated by the filtering or location update policy. In one embodiment, the predetermined sampling frequency is greater than the frequency at which location updates are reported by the UE 201 and/or the vehicle 203. In one embodiment, the filtering policy can be enforced on at the network side (e.g., the receiving server such as the location sampling platform 205). In this embodiment, the server can discard location points according to the filtering in real-time as the points are received, or in a batch process after all or predetermined number of location updates have been received. In yet another embodiment, the filtering policy can be used to compress previously collected location trajectories to reduce the number of location points within the trajectories while maintaining path reconstructability. It is contemplated that the compression can be performed at the client (e.g., the UE 201 and/or vehicle 203) or at the server (e.g., the location sampling platform 205).

In one embodiment, the probe or location data can be collected by the system 200 from the UE 201 and/or vehicle 203 in real-time, in batches, continuously, or at any other frequency requested by the system 200 over, for instance, the communication network 209 for storage and/or processing by the location sampling platform 205. The probe or location points also can be mapped to specific road links stored in the geographic database 207. In one embodiment, the system 200 (e.g., via the location sampling platform 205) can generate probe traces or trajectories from the probe points for an individual probe so that the probe trajectories represent a travel path of the probe through the road network. As previously discussed, the location sampling platform 205 can adaptive specify the location update intervals for the UE 201 and/or the vehicle 203 to report the probe or location points to guarantee path reconstructability.

In one embodiment, when a UE 201 and/or vehicle 203 requests navigation or mapping related services, the travel path of the device reconstructed from the collected probe or location data can be used as at least on input for providing the requested services. In one embodiment, these services can be provided by a service platform 211, one or more services 213a-213m (also collectively referred to as services 213), one or more content providers 215a-215k (also collectively referred to as content providers 215), or a combination thereof. In one embodiment, the UE 201 and/or vehicle 203 may execute a client application 217 to access the services or functions of the service platform 211, the services 213, and/or the content providers 215. In one embodiment, the client application 217 may perform one or more functions of the location sampling platform 205 for filtering location points in sample trajectory. In this embodiment, the client application 217 may act in addition to or in place of the location sampling platform 205.

By way of example, the UE 201 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

As described, the UE 201 and/or vehicle 203 may be configured with applications 217 for interacting with the location sampling platform 205, geographic database 207, service platform 211, services 213, content providers 215, or a combination thereof. Through these services, the applications 217 may acquire navigation information, location information, mapping information, other data associated with the current location of the UE 201 and/or vehicle 203, a direction or movement of the vehicle along a roadway, etc.

As discussed above, the UE 201 and/or vehicle 203 may be configured with various sensors for acquiring and/or generating probe or location data at adaptive sampling rates. For example, the sensors may be used as GPS receivers for interacting with one or more satellites 219 to determine and track the current speed, position and location of a vehicle travelling along a roadway. In addition, the sensors may gather tilt data (e.g., a degree of incline or decline of the vehicle during travel), motion data, light data, sound data, image data, weather data, temporal data and other data associated with the UE 201 and/or vehicle 203. Still further, the sensors may detect local or transient network and/or wireless signals, such as those transmitted by nearby devices during navigation along a roadway. This may include, for example, network routers configured within a premise (e.g., home or business), another UE 201 or vehicle 203, or a communicable traffic system (e.g., traffic lights, traffic cameras, traffic signals, digital signage).

By way of example, the location sampling platform 205 may be implemented as a cloud based service, hosted solution or the like for performing the above described functions. Alternatively, the location sampling platform 205 may be directly integrated for processing data generated and/or provided by the service platform 211, services 213, content providers 215, and/or applications 217. Per this integration, the location sampling platform 205 may perform client-side adaptive location sampling as described with respect to the various embodiments described herein.

By way of example, the communication network 209 of system 200 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the location sampling platform 205 communicates with other components of the system 200 using well known, new or still developing protocols. In this context, a protocol includes a set of rules defining how the network nodes within the communication network 209 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
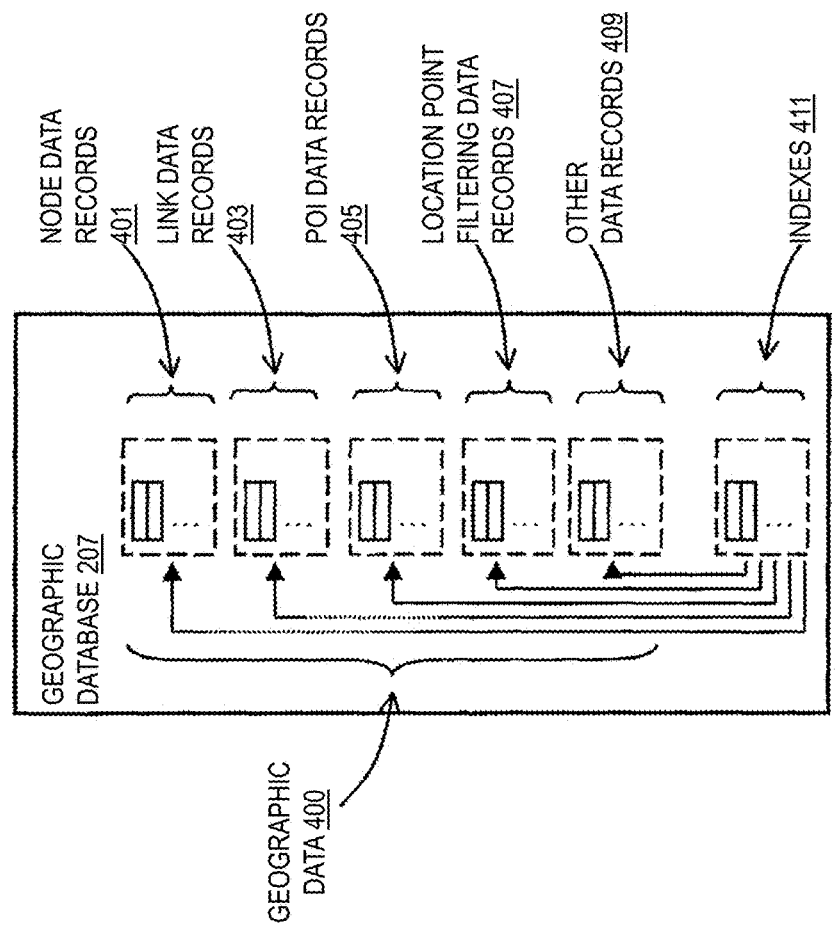
FIG. 4 is a diagram of a geographic database used for filtering location points in a sampled trajectory while maintaining path reconstructability, according to one embodiment.

FIG. 4 is a diagram of the geographic database 207, according to one embodiment. In one embodiment, adaptive sampling intervals and/or any other information used or generated by the system 200 to calculate the sampling intervals can be stored, associated with, and/or linked to the geographic database 207 or data thereof. In one embodiment, the geographic or map database 207 includes geographic data 400 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 207 includes node data records 401, road segment or link data records 403, POI data records 405, location point filtering data records 407, other data records 409, and/or indexes 411 for example. More, fewer or different data records can be provided.

In one embodiment, the indexes 411 may improve the speed of data retrieval operations in the geographic database 207. In one embodiment, the indexes 411 may be used to quickly locate data without having to search every row in the geographic database 207 every time it is accessed. In one embodiment, the other data records 409 include cartographic ("carto") data records, routing data, and maneuver data. As noted above, the maneuver data identify potential maneuvers within a network comprised of two or more adjacent road links. In other words, a maneuver indicate possible turns or other actions a device traveling a transportation network can take. In one embodiment, maneuvers are defined at intersections nodes where different turns or actions can be taken. Each maneuver would then comprise the links making up each possibility (e.g., links indicating a left turn at the intersection node, a right turn at an intersection node, continuing straight at an intersection node, etc.).

In one embodiment, one or more portions, components, areas, layers, features, text, and/or symbols of the POI or event data can be stored in, linked to, and/or associated with the geographic data 400 using the POI data records 405. For example, one or more portions of a POI and/or characteristics of the POI (e.g., descriptive metadata, related event data, etc.) can be matched with respective map or geographic records via position or GPS data associations (such as using known or future map matching or geo-coding techniques), for example. In one embodiment, the POI data records 405 may also include information on locations of traffic controls (e.g., stoplights, stop signs, crossings, etc.).

In exemplary embodiments, the road segment or link data records 403 are links or segments representing roads, streets, or paths, as can be used in the calculated route or recorded route information. The link data records 403 can include road density information that represent at least a physical length of a link. In some embodiments, the length or road density of link can be measured directly from the road way or may be calculated as the distance between the starting and ending nodes of the link. In one embodiment, the one or more adjacent links can be combined into a super link as discussed in the various embodiments described herein. In this case, the link data records 403 can also store information on super links (e.g., combinations or sequences of links) that have been created, and information on the regular links included the corresponding super link. The link data records can also indicate a direction of travel along the link to facilitate determining available paths through a road network. In one embodiment, the node data records 401 are end points corresponding to the respective links or segments of the road segment data records 403.

The road link data records 403 and the node data records 401 represent a road network, such as used by vehicles, cars, and/or other entities. In other words, the nodes and links of the data records 401 and 403 comprise a system for representing the geospatial characteristics of a transportation nodes represent various location points (e.g., latitude and longitude) of the network and the links represent an extent of a road or path between the nodes. Generally, the nodes are located at intersections points of the road network to minimize the number of nodes needed to represent a transportation network. However, in some embodiments, a node can also fall at a non-intersection point. In which, the node at the non-intersection can be a shape node which can be used to indicate or more closely follow a road or path with a more complex shape. Alternatively, the geographic database 207 can contain path segment and node data records or other data that represent pedestrian paths or areas in addition to or instead of the vehicle road record data, for example.

The road link and nodes can be associated with attributes, such as a functional class, a road density or link length, a speed attribute (e.g., speed limit along a link, a free-flow speed of traffic along a link, and/or any other indication of an expected speed of travel along the link), parking availability information, geographic coordinates, street names, address ranges, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. As indicated above, the geographic database 400 can include data about the POIs and their respective locations in the POI data records 405. The geographic database 400 can also include data about places, such as cities, towns, or other communities, and other geographic features, such as bodies of water, mountain ranges, etc. Such place or feature data can be part of the POI data or can be associated with POIs or POI data records 405 (such as a data point used for displaying or representing a position of a city).

In one embodiment, the geographic data 400 also includes location point filtering data records 407 that the filtering policies generated by the system 200. In addition, the data records 407 can store unfiltered location updates that are reported by probes or devices according to the filtering policy, and/or any related information. In yet another embodiment, the data records 407 can store timing and/or distance threshold values used for evaluating whether to keep or discard location points in a sampled trajectory. For example, the threshold values can be precomputed by the system 200 for different node pair combinations for road networks represented in the geographic database. The data records can also store precomputed fastest alternative routes or trunks between node pairs evaluated on a node pair basis to determine fastest alternative routes, travel times, and/or the like. The precomputed data can be generated for the most popular routes (e.g., as determined from reported probe traces or trajectories), and/or can be compiled as the system 200 computes for evaluation received location points. In one embodiment, the location point filtering data records 407 can be associated with the node (e.g., intersection node) and/or link data records 401 and 405 of the geographic database 400 to tie the data records 407 respectively to particular link(s) of the geographic database 400.

In one embodiment, the geographic database 400 can be maintained by the content provider 215 in association with the service platform 211 (e.g., a map developer). The map developer can collect geographic data to generate adaptive location sampling intervals and enhance the geographic database 207. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 400 can be a master geographic database stored in a format that facilitates updating, maintenance, and development. For example, the master geographic database 400 or data in the master geographic database 400 can be in an Oracle spatial format or other spatial format, such as for development or production purposes. The Oracle spatial format or development/production database can be compiled into a delivery format, such as a geographic data files (GDF) format. The data or publication thereof may be partitioned into channels configured for incremental updates. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 201 and/or vehicle 203, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 400 can be a master geographic database, but in alternate embodiments, the geographic database 400 can represent a compiled navigation database that can be used in or with end user devices (e.g., UE 201, vehicle 203, etc.) to provide navigation- or mapping-related functions. For example, the geographic database 400 can be used with the end user device 201 and/or 203 to configure the device for filtering location points in a sampled trajectory while maintaining path reconstructability as discussed with respect to the various embodiments described herein. In such a case, the geographic database 400 can be downloaded or stored on the end user device (e.g., UE 201, vehicle 203, etc.), such as in applications 217, or the end user device 201 or 203 can access the geographic database 400 through a wireless or wired connection (such as via a server and/or the communication network 209), for example.

Figure 5:
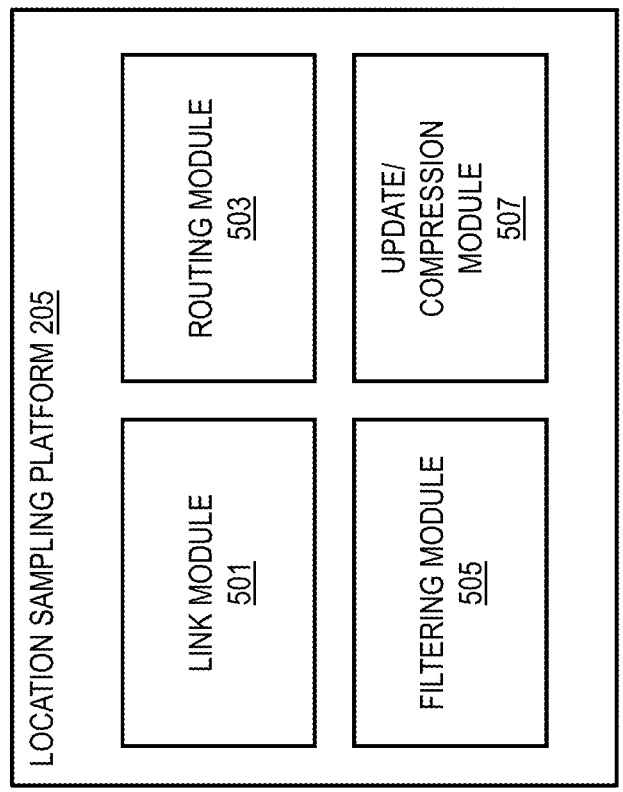
FIG. 5 is a diagram of the components of a location sampling platform used for filtering location points in a sample trajectory, according to one embodiment.

FIG. 5 is a diagram of the components of a location sampling platform 205, according to one embodiment. By way of example, the location sampling platform 205 includes one or more components for providing adaptive location sampling in mobile devices. It is contemplated that the functions of these components may be combined or performed by other components of equivalent functionality. In this embodiment, the location sampling platform 205 includes a link module 501, a routing module 503, a filtering module 505, and an update/compression module 507. The above presented modules and components of the location sampling platform 205 can be implemented in hardware, firmware, software, or a combination thereof. Though depicted as a separate entity in FIG. 2, it is contemplated that the location sampling platform 205 may be implemented as a module of any of the components of the system 200. In another embodiment, one or more of the modules 501-507 may be implemented as a cloud based service, local service, native application, or combination thereof. The functions of these modules are discussed with respect to FIGS. 6-9 below.

Figure 6:
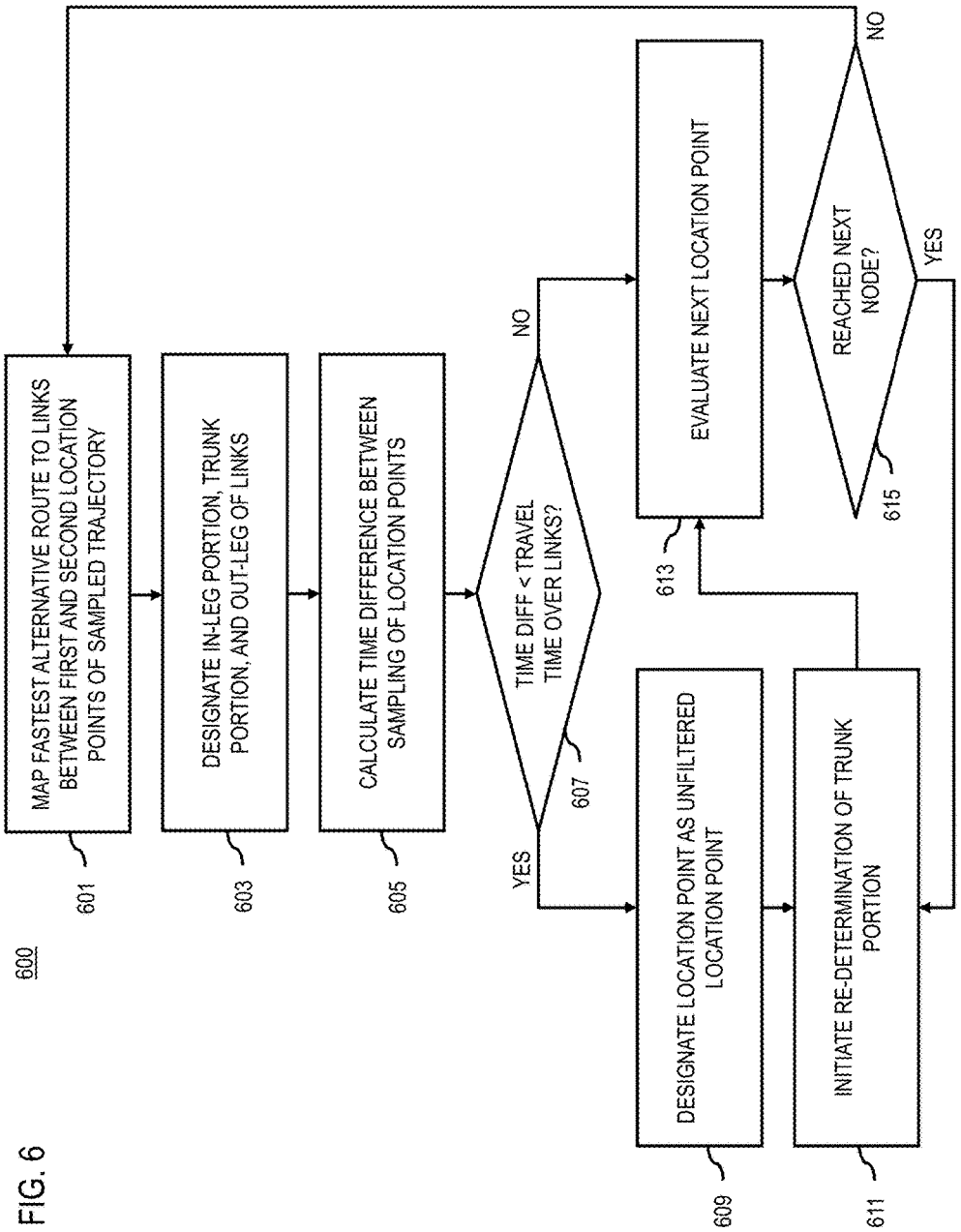
FIG. 6 is a flowchart of a process for filtering location points in a sampled trajectory with respective links of geographic database, according to one embodiment.

FIG. 6 is a flowchart of a process for providing adaptive location sampling in a mobile device based on travel times of maneuvers, according to one embodiment. In various embodiments, the location sampling platform 205 and/or the modules 501-507 of the location sampling platform 205 as shown in FIG. 5 may perform one or more portions of the process 600 and may be implemented in, for instance, a chip set including a processor and a memory as shown in FIG. 10. As such, the location sampling platform 205 and/or the module 501-507 can provide means for accomplishing various parts of the process 600, as well as means for accomplishing embodiments of other processes described herein in conjunction with other components of the system 200. Although the process 600 is illustrated and described as a sequence of steps, its contemplated that various embodiments of the process 600 may be performed in any order or combination and need not include all of the illustrated steps.

In one embodiment, the process 600 represents a location update policy in which time is divided into discrete time units, and the update policy is applied to a road network represented by a link and node-based mapping system. In one embodiment, the discrete time units correspond to the sampling interval at which a probe or device is configured to sample location points to build a location trajectory or trace. For example, the sampled trajectory includes a plurality of location points sampled by one or more sensors of a device traversing the road network. In this embodiment, the policy executes by cycles according to the discrete time units. Each cycle starts at the time when a location update is sent and ends at the time when a next location update is sent. In the description below, the location update is also referred to as the first location point. Because this first location point was sent as an update, it is also designated as an unfiltered location point (e.g., a location point that is kept by the policy). In this example, for the update location point, the link module 501 denotes its update location as $p_1$, the update link as $l_1$, and the update time as $t_1$.

Proceeding to step 601, the routing module 503 determines a fastest alternative route between the first location point and a second location point in a sampled trajectory. In one embodiment, the fastest alternative route is determined as follows. Let an actual traveled route $R=<a_1, a_2, \ldots, a_n>$. For each node $a_i$ ($1 \le i \le n$) in R, the routing module 503 determines each of its outgoing link ($a_i$, b) that is not in P, and finds the fastest path from b to $a_n$. A concatenation of the part of P until $a_i$, the link ($a_i$, b), and the fastest path from b to $a_n$ form one or more alternative routes from $a_1$ to $a_n$. The routing module 503 can determine the travel times for each of the one or more alternative routes. The routing module 503 designates the fastest of these as the fastest alternative route (FAR) of R.

In on embodiment, in the first cycle immediately after the first update location point (e.g., before a subsequent update location point has been taken), the second location point can be considered to be the same location as the first location point. This will be true until the next cycle when the probe or device moves and collects a subsequent location point in its trajectory. The link module 501 then maps the fastest alternative route to one or more links of a geographic database representing a road network by determining the links for the for both the actual traveled route as well as the for the fastest alternative route.

In step 603, the link module 501 designates an in-leg portion, a trunk portion, and/or an out-leg portion of the one or more links. For example, with respect to the first location point as denoted above, at $t_1$, the fastest alternative trunk (FAT) for on-link check is computed. This FAT is the fastest path from the head of $l_1$ to the tail of $l_1$. In one embodiment, the fastest alternative route (FAR) is initialized as follows. The in-leg is the portion of $l_1$ starting from $p_1$ until the head of $l_1$, the out-leg is the portion of $l_1$ starting from the tail of $l_1$ until $p_1$, and the trunk is the FAT. In one embodiment, the filtering module 505 computes a base FAR MTT time which is the MTT of the in-leg plus the MTT of the FAT. This base FAR MTT will remain unchanged until the probe reaches head of $l_1$.

In step 605, the filtering module 505 calculates a sampling time difference between a time at which the first location point was sampled and another time at which the second location point was sampled. In other words, for each time unit t after $t_1$, the filtering module 505 denotes by p the location at t and l the link at t, and proceeds to step 607.

In step 607, the filtering module 505 determines if the sampling time difference is less than a free-flow travel time calculated for traversing the one or more links by more than a threshold value. In one embodiment, there are three cases for making this determination.

In a first case, l is the same as the previous time unit and the distance from p to the head of l is not smaller than can be traveled at the speed limit over the time unit designated for a cycle (i.e., an on-link check). In one embodiment, the unit of speed limit is distance per time unit. Thus, for example, if the speed limit in metric unit is 10 m/s and the length of each time unit is 0.1 second, then the speed limit is 1 m/time unit. In this case, the filtering module 505 computes the MTT of FAR by adding the MTT of the out-leg to the base FAR MTT calculated above. In other words, the out-leg portion is updated as the second location point changes to a subsequent location of the device along the sampled trajectory. In this way, only the linear increase of the out-leg portion needs to be recomputed to compute the FAR MTT because the base MTT (e.g., comprising the MTT of the in-leg and the trunk) remains the same until the probe reaches the head of l.

If the difference between $t-t_1$ and the FAR MTT is smaller than or equal to one time unit, then make a location update (e.g., designates location point as an unfiltered location point as described in step 609) and start another cycle (e.g., proceeding to steps 611 and 613). In addition, because the location update also resets which update location is to be considered as the first location point (e.g., the latest location update point), the in-leg portion also is updated to another link in which the second location point (e.g., now the new latest location update point) is located when the second location point is designated as the next unfiltered location point. The filtering module 505 then starts the next cycle to evaluate the next location point in the sampled trajectory by proceeding to step 613.

In a second case, l is the same as the previous time unit and the distance from p to the head of l is smaller than can be traveled at the speed limit over the time unit designated for a cycle (i.e., on-node check) (step 615). In this case, the filtering module computes the MTT of the fastest alternative route from $p_1$ to the head of l. If the difference between $t-t_1$ and this MTT is smaller than or equal to one time unit, then make a location update and start another cycle by returning to step 601.

In a third case, l is different than the previous time unit. In this case, the filtering module 505 re-computes the FAT to be the fastest alternative path from the head of $l_1$ to the tail of l (step 611). The filtering module 505 also updates the base FAR MTT accordingly for use in subsequent cycles.

If the sampling time difference is not less than a free-flow travel time, the process proceeds directly from step 607 to step 613 to evaluate the next location point in the sampled trajectory and start another cycle.

In step 615, the filtering module 505 determines whether the next location point has reached the next node of the road network. If the next node has been reached, the filtering module 505 returns to step 611 to initiate the re-determination of the trunk portion. In other words, the re-determination of the trunk portion is further initiated when the second location point indicates that the device has reached a subsequent node. If the next node has not been reached, the filtering module 505 returns to step 601 to start a new cycle begin evaluation of the next location point in the sample trajectory.

In one embodiment, at each cycle, if a location point is designated as unfiltered and is to be kept, the update/compression module 507 initiate the appropriate action for a given application. For example, when the filtering policy is implemented to determine when a probe should transmit a location update to a server or otherwise provide a location update to another component external to the device while maintaining path reconstructability, the update/compression module 507 can initiate a transmission of the unfiltered location point as an update, and does not transmit any location point that is filtered or discarded according to the policy. Similarly, when the filtering policy is implemented to for compression of a sampled trajectory, the update/compression module 507 adds unfiltered location points to a compressed version of a sampled trajectory and discards the filtered location points from the compressed trajectory. In this way, the number of location points in the compressed trajectory is minimized while still maintaining path reconstructability.

Figure 7:
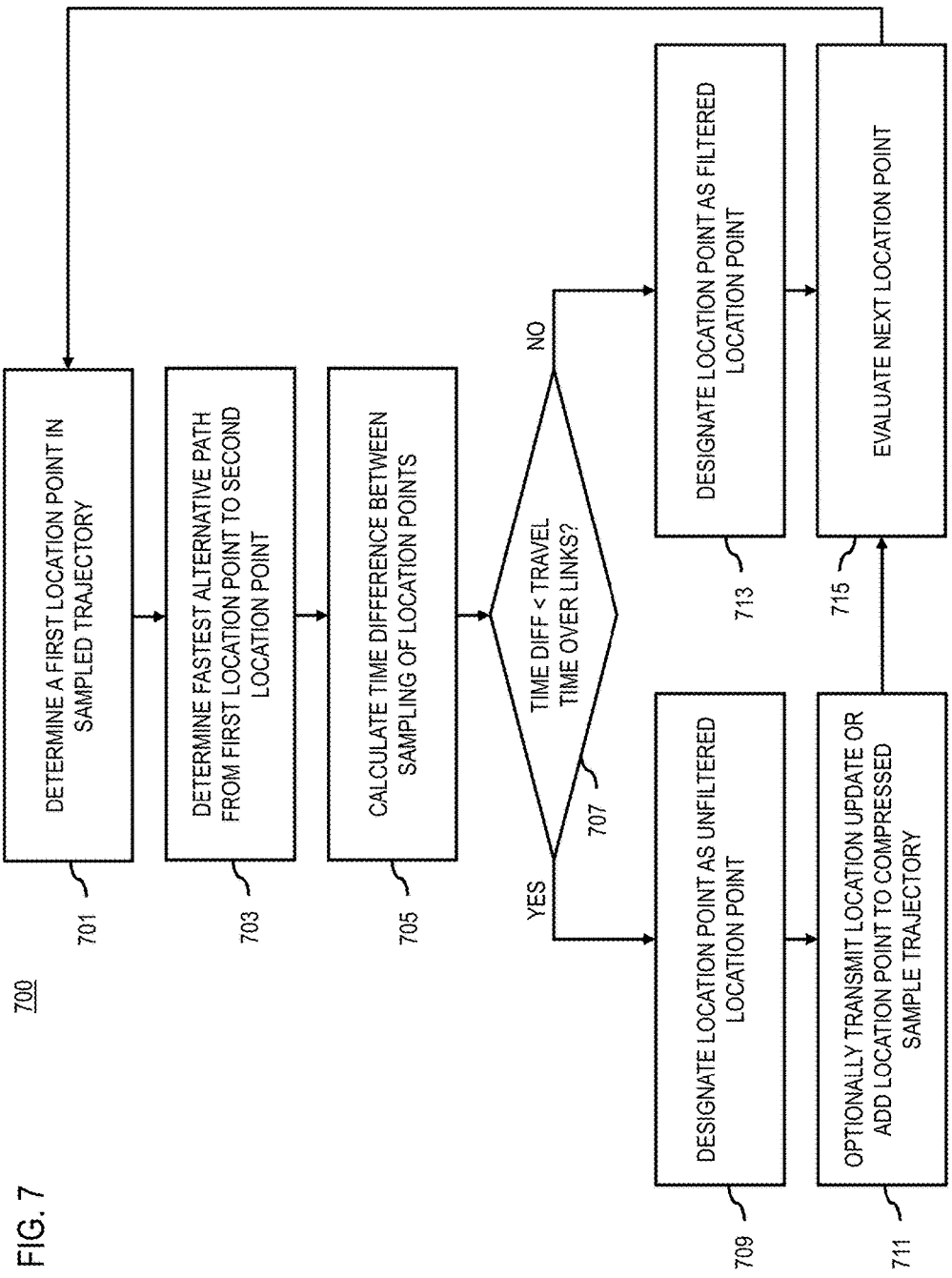
FIG. 7 is a flowchart of a general process for filtering locations points in a sampled trajectory, according to one embodiment.

FIG. 7 is a flowchart of a process for a general process for filtering locations points in a sampled trajectory, according to one embodiment. In various embodiments, the location sampling platform 205 and/or the modules 501-507 of the location sampling platform 205 as shown in FIG. 5 may perform one or more portions of the process 700 and may be implemented in, for instance, a chip set including a processor and a memory as shown in FIG. 10. As such, the location sampling platform 205 and/or the module 501-507 can provide means for accomplishing various parts of the process 700, as well as means for accomplishing embodiments of other processes described herein in conjunction with other components of the system 200. Although the process 700 is illustrated and described as a sequence of steps, its contemplated that various embodiments of the process 700 may be performed in any order or combination and need not include all of the illustrated steps.

In one embodiment, the process 700 describes a general embodiment of the location point filtering approach that does not refer to a link and node-based representation of a road network. Instead, it is contemplated that the various embodiments described herein are applicable to any representation of a road network that enable calculates of fastest alternative routes and the free-flow travel time for traversing the route.

In step 701, the location sampling platform 205 determines a first location point in the sampled trajectory that is an unfiltered location point, wherein the sampled trajectory includes a plurality of device location points sampled by one or more sensors of a device traversing a road network. It is noted the term "first" is used to differentiate the location point from the "second" location point referred to below, and is not intended to refer to an ordinal position of the location point in the sample trajectory. Instead, in one embodiment, this first location point refers to the closest previous location point that was designated as unfiltered (e.g., to be kept) with respect to a current location point under evaluation. The effect of the unfiltered status, for instance, can be dependent on the application to which the filtering policy is being applied. For example, with respect to a periodic location update, an unfiltered location point refers to a location point that is kept for transmission as a location update so that the transmitted location points still guarantee path reconstructability. With respect to trajectory compression, an unfiltered location point refers to a location added to a compressed trajectory (e.g., with filtered points being discarded from the compress trajectory) so that the compressed trajectory also guarantees path reconstructability.

In step 703, the location sampling platform 205 determines a fastest alternative path from the first location point to a second location point that follows the first location point in the sampled trajectory. It is contemplated that the location sampling platform 205 can use any routing engine known in the art to determine the fastest alternative path or route with respect to an actual route traveled by a probe. An example process for finding the fastest alternative route is described above. In general, the location sampling platform determines a distance between the first location point and the second location point that follows along the actual travel route (e.g., determined based on the densely sampled trajectory). The actual travel route can be map matched to specific roads or paths. The recorded speed attributes, speed limits, or other indication of an expected or maximum speed of travel along the route is determined. The travel time is then determined from the route length and the determined speed. This determination is equivalent to the initiation of the on-link check described above. In one embodiment, the second location point need not immediately follow in time sequence from the first location point. In other words, the second location point can be any point collected subsequent to the first location point (e.g., an unfiltered location point). In one embodiment, there is no intervening other unfiltered location point falling between the first location point and the second location point in the sampled trajectory.

In one embodiment, the location sampling platform 205 can also determine another fastest alternative path or route based on the second location point's proximity to an upcoming intersection point in the road network. Accordingly, the location sampling platform 205 can determine that the second location point is within a threshold distance of an intersection point in the road network. By way of example, an intersection point is a location in the road network where at least two road cross, join, or split. The location sampling platform 205 can determine another fastest alternative path from the first location point to the intersection point to represent an on-node check.

In one embodiment, the location sampling platform 205 can perform either the on-link check or the on-node check independently or in combination. In other words, either test can be used to independently determine whether a location point should be kept or discarded. In another embodiment, the location sampling platform 205 can use the second location point's proximity to an intersection point to determine which type of check to perform. For example, when the first lo In step 705, the location sampling platform 205 calculates a sampling time difference between a time at which the first location point was sampled and another time at which the second location point was sampled. As previously described, probe points are reported with at least a location and a time the probe was at that location. Accordingly, the location sampling platform 205 can extract the timing information from the location point data records.

In step 707, the location sampling platform 205 determines whether the sampling time difference is less that a free-flow travel time of the fastest alternative route by more than a threshold value. If an on-node check is performed, the free-low travel time is determined with respect to the other fastest alternative route calculated to the upcoming intersection point. In one embodiment, the threshold value for the sampling time difference is based on a location sampling frequency that is used by the device to create the sampled trajectory. The threshold value, for instance, can be set as at least the sampling interval of the probe, to reduce the possibility that if a current location point is discarded, the next location point is not likely to result in a sampling time difference that would exceed the free-flow travel time of the fastest alternative route. This, in turn, would result in a potentially ambiguous path reconstruction. In one embodiment, the probes are configured for relatively dense sampling, meaning that the location sampling frequency is greater than a frequency at which the device transmits location updates, a frequency at which a location point is selected to be included in a compressed version of the sampled trajectory, or a combination thereof.

In step 709, the location sampling platform 205 designates the second location point as a next unfiltered location point when the sampling time difference is within a threshold value of a free-flow travel time calculated for the fastest alternative path. In the case of an on-node check, the location sampling platform 205 designates the second location point as the next unfiltered location point when the sampling time difference and the another free-flow travel time calculated for the another fastest alternative path differ by less than a calculated time for the device to traverse the threshold distance to the intersection point. In one embodiment, the location sampling platform 205 optionally transmits the second location point as a location update when the second point is designated as the next unfiltered location point, and/or adds the second location point to a compressed version of the sampled trajectory when the second point is designated as the next unfiltered location point (step 711). If additional location points are to be process, the location sampling platform 205 continues to step 715.

In step 713, the location sampling platform 205 designates the second location point as a filtered location point when the sampling time difference is not within a threshold criterion or value of the of a free-flow travel time calculated for the fastest alternative path.

In step 715, the sampling platform 205 processes each subsequent location point in the travel trajectory to designate said each subsequent location point as either unfiltered or filtered based on a respective fastest alternative path and a respective sampling time difference with respect to said each subsequent location point and an immediate previous unfiltered location point.

The processes described herein for filtering location points in a sampled trajectory while maintaining path reconstructability may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
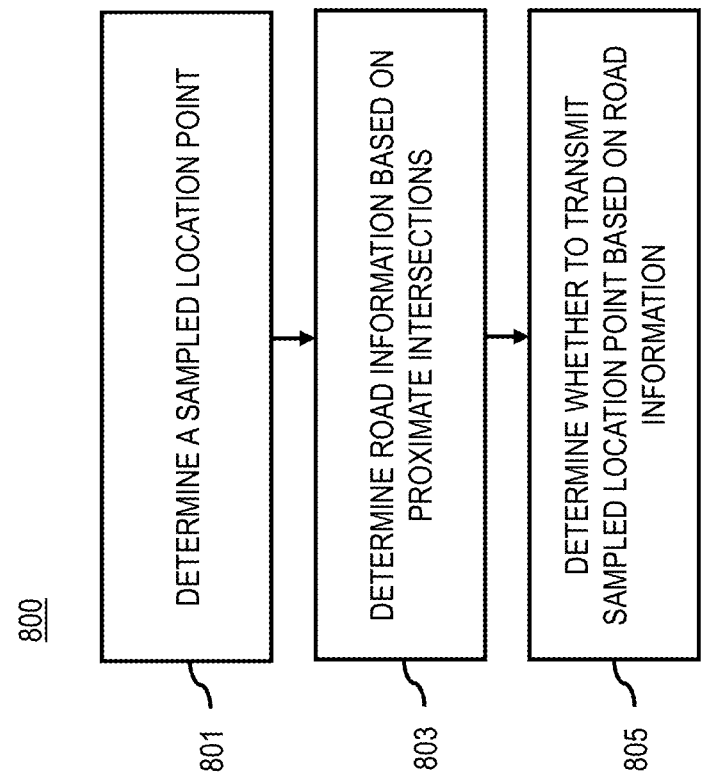
FIG. 8 is a flowchart of a process for transmitting location points while maintaining path reconstructability, according to one embodiment.

FIG. 8 is a flowchart of a process for transmitting location points while maintaining path reconstructability, according to one embodiment. In various embodiments, the location sampling platform 205 and/or the modules 501-507 of the location sampling platform 205 as shown in FIG. 5 may perform one or more portions of the process 800 and may be implemented in, for instance, a chip set including a processor and a memory as shown in FIG. 10. As such, the location sampling platform 205 and/or the module 501-507 can provide means for accomplishing various parts of the process 800, as well as means for accomplishing embodiments of other processes described herein in conjunction with other components of the system 200. Although the process 800 is illustrated and described as a sequence of steps, its contemplated that various embodiments of the process 800 may be performed in any order or combination and need not include all of the illustrated steps.

In one embodiment, the process 800 is an example of applying the processes 600 and 700 described above to determine which sample location points are to be transmitted from a device (e.g., a vehicle) sampling its location as it travels in a road network.

In step 801, the location sampling platform 205 determines a sampled location point indicating a location of a device within a road network. The sample location point is, for instance, a location point within a sampled trajectory sensed by one or more sensors (e.g., location sensors) of the device. As previously described, the device can be configured to densely sample its location trace or trajectory (e.g., as a sequence of location points over time) and then selectively transmitted individual location points in the trajectory so that the amount of data to transmit is minimized while guaranteeing path reconstructability from the transmitted location points (e.g., transmitted as location updates).

In step 803, the location sampling platform 205 determines road information based one or more intersection points proximate to the location of the device. For example, the road information provides structural details of the physical layout of the portion of the road network in which the device is traveling. More specifically, the location sampling platform 205 can determine whether there are intersections or other junctions nearby a path of the device. By way of example, intersections or junctions in the road network are locations in the road network where two or more road segments join or diverge. When a road network is represented as links and nodes as described above, intersections or junctions typically correspond to nodes of the geographic database.

In one embodiment, the location sampling platform 205 uses the proximity of nearby intersection or junction points as an indicator of potential alternative paths or routes that can be taken by the device. Accordingly, the road information is based on an analysis of a fastest alternative path provided by the one or more intersection points between the sampled location point and a previously sampled location point. By way of example, the previously sampled location point indicates a previous location of the device at which a previous location update was transmitted. The analysis of the fastest alternative path is performed as described above (e.g., with respect to FIGS. 6 and 7).

In one embodiment, the road information is a stored record of the analysis. In other words, the analysis is precomputed and stored in the stored record prior to the device traveling in the road network. For example, as previously described, fastest alternative routes between ordered pairs of nodes in a road network can be precomputed and stored as road information data records. In one embodiment, the road information data records as stored as part of the location point filtering data records 407 of the geographic database 207.

In another embodiment, the road information is determined in real-time with respect to determining the sampled location point. In this way, the location sampling platform 205 need not precompute the road information. Instead, when operating in real-time mode, the location sampling platform 205 can evaluate each individual point in sampled trajectory as the point is collected or stored by the device traveling the road network. It is noted that in one embodiment, "real-time" refers to processing the location point within a predetermined window of time following the collection or storage of the sampled location point. This predetermined window of time can be configured from fractions of seconds, seconds, minutes, etc. depending on timing tolerances desired for the system 200.

In step 805, the location sampling platform 205 determines whether to transmit the sampled location point as a location update based on the road information. As indicated above, in one embodiment, the road information is based on an analysis of the fastest alternative route between the sampled location point and the previously transmitted location point. Accordingly, the location sampling platform 205 can determine whether to transmit the sample location point using the various embodiments of the processes 600 and/or 700 described above. For example, in one embodiment, the sampled location point is transmitted when a sampling time difference between the sampled location point and the previously sampled location point is with a threshold criterion of a free-flow travel time calculated from the fastest alternative path.

Figure 9:
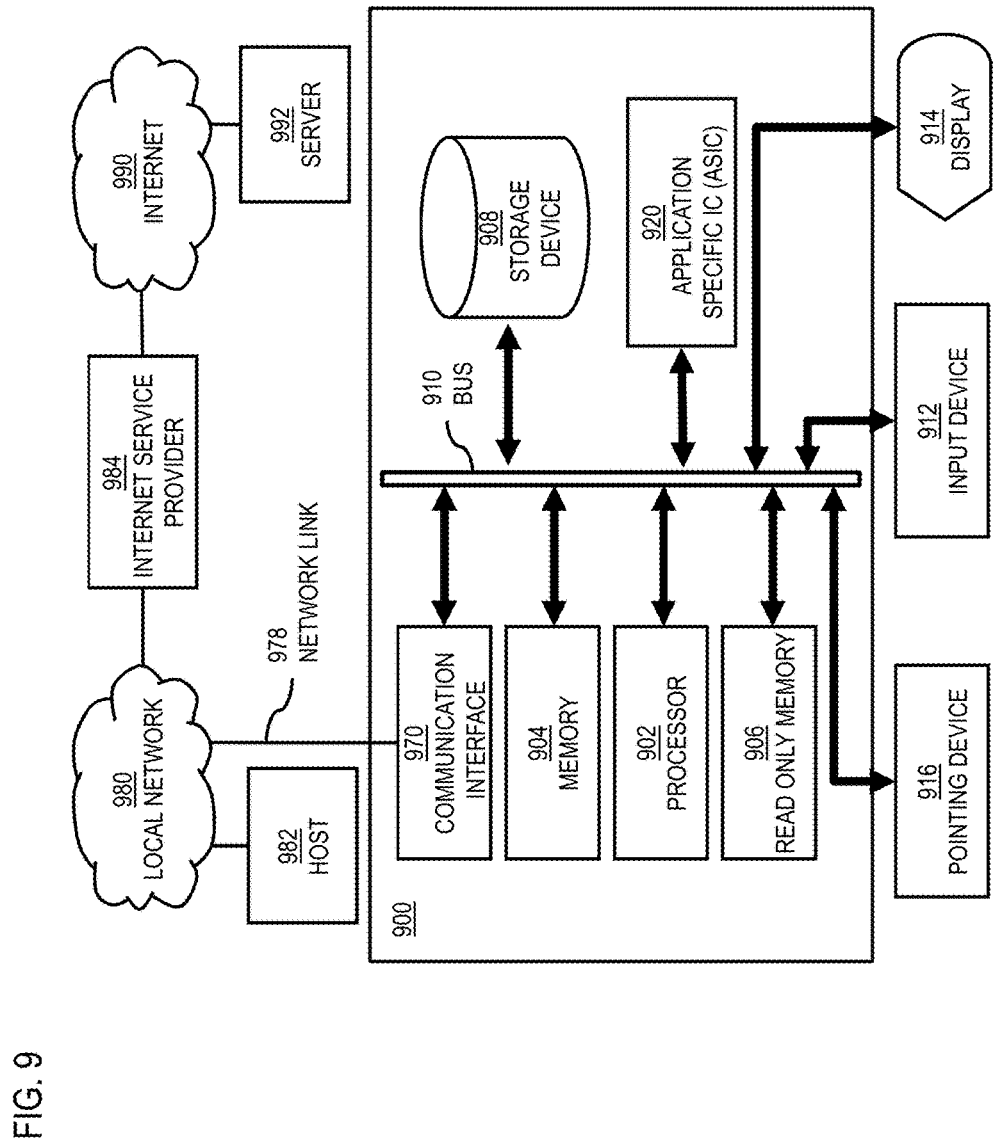
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to filter location points in a sampled trajectory while maintaining path reconstructability as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to filtering location points in a sampled trajectory while maintaining path reconstructability. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for filtering location points in a sampled trajectory while maintaining path reconstructability. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for filtering location points in a sampled trajectory while maintaining path reconstructability, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 209 for filtering location points in a sampled trajectory while maintaining path reconstructability.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to filter location points in a sampled trajectory while maintaining path reconstructability as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to filter location points in a sampled trajectory while maintaining path reconstructability. The memory 1005 also stores the data associated with or generated by the execution of the inventive steps.

FIG. 11 is a diagram of exemplary components of a mobile terminal 1101 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to filter location points in a sampled trajectory while maintaining path reconstructability. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for filtering device location points in a sampled trajectory to provide a unique path reconstruction comprising:
   determining a first location point in the sampled trajectory that is an unfiltered location point, wherein the sampled trajectory includes a plurality of device location points sampled by one or more sensors of a device traversing a road network;
   determining a fastest alternative path from the first location point to a second location point that follows the first location point in the sampled trajectory;
   calculating a sampling time difference between a time at which the first location point was sampled and another time at which the second location point was sampled;
   designating the second location point as a next unfiltered location point when the sampling time difference is within a threshold value of a free-flow travel time calculated for the fastest alternative path; and
   designating the second location point as a filtered location point when the sampling time difference is not within a threshold criterion of a free-flow travel time calculated for the fastest alternative path.

2. The method of claim 1, further comprising:
   transmitting the second location point as a location update when the second point is designated as the next unfiltered location point.

3. The method of claim 1, further comprising:
   adding the second location point to a compressed version of the sampled trajectory when the second point is designated as the next unfiltered location point.

4. The method of claim 1, further comprising:
   processing each subsequent location point in the travel trajectory to designate said each subsequent location point as either unfiltered or filtered based on a respective fastest alternative path and a respective sampling time difference with respect to said each subsequent location point and an immediate previous unfiltered location point.

5. The method of claim 1, further comprising:
   determining that the second location point is within a threshold distance of an intersection point in the road network;
   determining another fastest alternative path from the first location point to the intersection point; and
   designating the second location point as the next unfiltered location point when the sampling time difference and the another free-flow travel time calculated for the another fastest alternative path differ by less than a calculated time for the device to traverse the threshold distance to the intersection point.

6. The method of claim 1, wherein the threshold value for the sampling time difference is based on a location sampling frequency that is used by the device to create the sampled trajectory.

7. The method of claim 6, wherein the location sampling frequency is greater than a frequency at which the device transmits location updates, a frequency at which a location point is selected to be included in a compressed version of the sampled trajectory, or a combination thereof.

8. An apparatus for filtering device location points in a sampled trajectory to provide a unique path reconstruction comprising:
   at least one processor; and
   at least one memory including computer program code for one or more programs,
   the at least one memory and the computer program code configured to, with the at least one processor, cause the apparatus to perform at least the following,
   determine a first location point in the sampled trajectory that is an unfiltered location point, wherein the sampled trajectory includes a plurality of device location points sampled by one or more sensors of a device traversing a road network;
   calculate a sampling time difference between a time at which the first location point was sampled and another time at which a second location point was sampled, wherein the second location point follows the first location point in the sample trajectory;

when the second location point is not within a threshold distance of an intersection point of the road network, designate the second location point as a next unfiltered location point when the sampling time difference is within a threshold value of a free-flow travel time calculated for a fastest alternative path between the first location point and the second location point; and when the second location point is within a threshold distance of the intersection point, designate the second location point as the next unfiltered location point when the sampling time difference and another free-flow travel time calculated for another fastest alternative path between the first location point and the intersection point differ by less than a calculated time for the device to traverse the threshold distance to the intersection point.

9. The apparatus of claim 8, wherein the apparatus is further caused to:

initiate a transmission of the second location point as a location update, an addition of the second location point to a compressed version of the sampled trajectory, or a combination thereof when the second point is designated as the next unfiltered location point.

10. The apparatus of claim 8, wherein the apparatus is further caused to:

designate the second location point as a filtered location point either when the sampling time difference is not within a threshold value of the free-flow travel time, or when the sampling time difference and the another free-flow travel time do not differ by less than the calculated time for the device to traverse the threshold distance to the intersection point.

11. The apparatus of claim 8, wherein the apparatus is further caused to:

process each subsequent location point in the travel trajectory to designate said each subsequent location point as either unfiltered or filtered based on a respective fastest alternative path and a respective sampling time difference with respect to said each subsequent location point and an immediate previous unfiltered location point.

12. A non-transitory computer-readable storage medium for filtering device location points in a sampled trajectory to provide a unique path reconstruction, carrying one or more sequences of one or more instructions which, when executed by one or more processors, cause an apparatus to at least perform the following steps:

mapping a fastest alternative route from a first location point in the sampled trajectory to a second location point in the sampled trajectory to one or more links of a geographic database representing a road network, wherein the sampled trajectory includes a plurality of device location points sampled by one or more sensors of a device traversing the road network, and wherein the first location point is an unfiltered location point;

designating one or more complete links among the one or more links as a trunk portion, wherein each of the one or more complete links include a respective tail node and a head node that lies within the fastest alternative route;

calculating a sampling time difference between a time at which the first location point was sampled and another time at which the second location point was sampled;

designating the second location point as a next unfiltered location point when the sampling time difference is within a threshold value of a free-flow travel time calculated for traversing the one or more links; and initiating a re-determination of the trunk portion when the second location point is designated as the next unfiltered location point.

13. The non-transitory computer-readable storage medium of claim 12, wherein the re-determination of the trunk portion is further initiated when the second location point indicates that the device has reached a subsequent node.

14. The non-transitory computer-readable storage medium of claim 12, wherein the apparatus is further caused to perform:

designating an in-leg portion of a first link of the one or more links, wherein the in-leg portion spans the first link from the first location point to a tail of an adjacent following link.

15. The non-transitory computer-readable storage medium of claim 14, wherein the in-leg portion is updated to another link in which the second location point is located when the second location point is designated as the next unfiltered location point.

16. The non-transitory computer-readable storage medium of claim 12, wherein the apparatus is further caused to perform:

designating an out-leg portion of a last link of the one or more links, wherein the out-leg portion spans from the tail of the last link to a second location point in the sampled trajectory that follows the first location point.

17. The non-transitory computer-readable storage medium of claim 16, wherein the out-leg portion is updated as the second location point changes to a subsequent location of the device along the sampled trajectory.

18. A method for transmitting device location points to provide a unique path reconstruction comprising:

determining a sampled location point indicating a location of a device within a road network;

determining road information based on one or more intersection points proximate to the location of the device, wherein the road information is based on an analysis of a fastest alternative path provided by the one or more intersection points between the sampled location point and a previously sampled location point, and wherein the previously sampled location point indicates a previous location of the device at which a previous location update was transmitted; and determining whether to transmit the sampled location point as a location update based on the road information.

19. The method of claim 18, wherein the sampled location point is transmitted when a sampling time difference between the sampled location point and the previously sampled location point is within a threshold criterion of a free-flow travel time calculated from the fastest alternative path.

20. The method of claim 18, wherein the road information is a stored record of the analysis, and wherein the analysis is precomputed and stored in the stored record prior to the device traveling in the road network.

21. The method of claim 18, wherein the road information is determined in real-time with respect to determining the sampled location point.

* * * * *